(12) United States Patent
Kanai

(10) Patent No.: US 6,791,565 B2
(45) Date of Patent: Sep. 14, 2004

(54) CORRECTION CURVE GENERATING METHOD, IMAGE PROCESSING METHOD, IMAGE DISPLAY UNIT, AND STORAGE MEDIUM

(75) Inventor: Masashi Kanai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 496 days.

(21) Appl. No.: 09/949,997

(22) Filed: Sep. 12, 2001

(65) Prior Publication Data

US 2002/0051121 A1 May 2, 2002

(30) Foreign Application Priority Data

Sep. 13, 2000 (JP) ........................................ 2000-278078

(51) Int. Cl.$^7$ ................................................ G09G 5/02
(52) U.S. Cl. ........................ 345/589; 345/600; 345/690
(58) Field of Search ................................ 345/589, 595, 345/600, 207, 690, 63, 72, 76, 82, 83

(56) References Cited

U.S. PATENT DOCUMENTS

| | | | | |
|---|---|---|---|---|
| 5,287,173 A | * | 2/1994 | Onuma et al. | 348/655 |
| 5,760,843 A | | 6/1998 | Morimura et al. | |
| 6,297,859 B1 | * | 10/2001 | George | 348/747 |
| 6,396,217 B1 | * | 5/2002 | Weindorf | 315/169.1 |

FOREIGN PATENT DOCUMENTS

| | | | |
|---|---|---|---|
| EP | 0863677 A1 | 9/1998 | |
| EP | 1251482 A2 | * 10/2002 | ............ G09G/3/36 |
| GB | 2341033 A | 9/1998 | |
| GB | 2335326 | 9/1999 | |
| JP | 09084036 | 3/1997 | |
| JP | 09149337 | 6/1997 | |

* cited by examiner

Primary Examiner—Matthew Luu
(74) Attorney, Agent, or Firm—Lowe Hauptman Gilman & Berner

(57) ABSTRACT

It is intended to provide an image processing method, an image display unit, and a storage medium, capable of effecting an appropriate color reproduction even with a change in external environment.

The image display unit according to the present invention which applies a desired image processing to inputted image data and then displays the image, includes: a $1^{st}$ correction curve generating unit for generating a $1^{st}$ correction curve for correcting a change in brightness of external illumination, a $2^{nd}$ correction curve generating unit for generating a $2^{nd}$ correction curve for correcting a change in color of projection plane, and a $3^{rd}$ correction curve generating unit for generating a $3^{rd}$ correction curve for correcting a change in color of external illumination, Therefore, it is possible to effect an appropriate color reproduction even with a change in external environment, since the desired image processing to inputted image data is performed on the basis of the generated $1^{st}$ correction curve, the generated $2^{nd}$ correction curve and the generated $3^{rd}$ correction curve.

72 Claims, 21 Drawing Sheets

CORRECTION CURVE GENERATING METHOD, IMAGE PROCESSING METHOD, IMAGE DISPLAY UNIT, AND STORAGE MEDIUM

BACKGROUND OF INVENTION

1. Field of Invention

The present invention relates to a correction curve generating method, an image display method, an image display unit, and a storage medium, capable of correcting the influence of an external environment on output image.

2. Description of the Related Art

In case of using an image display unit such as a projector, it is important that an image intended by a producer be reproducible even if an external environment changes. As such a way of thinking of adjusting the visibility of image, there is known a way of thinking called color management in which input and output characteristics of a device are managed to reproduce color. But a concrete color management method taking changes of a working environment into account has not been made clear. Particularly, unless a change in brightness or color of external illumination, or color of projection plane is taken into account as a change of a working environment, it is difficult to make an appropriate reproduction of color. Generally, as the brightness of external illumination increases, the contrast of an output image in an image display unit decreases, making an appropriate color reproduction impossible. For example, even in case of displaying the same white, the displayed white may look somewhat yellowish, depending on the type of a projection plane used.

SUMMARY OF INVENTION

The present invention has been accomplished for solving the above-mentioned problem and it is an object of the invention to provide a correction curve generating method, an image processing method, an image display unit, and a storage medium, capable of making an appropriate color reproduction even with a change in external environment.

According to the present invention as described in claim 1, a method for generating correction curves for correcting image data inputted to an image display unit, includes: a $1^{st}$ correction curve generating step of generating a $1^{st}$ correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit; a $2^{nd}$ correction curve generating step of generating a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane; and a $3^{rd}$ correction curve generating step of generating a $3^{rd}$ correction curve which eliminates a difference in color components ratios of a predetermined external illumination.

According to the thus constructed method for generating correction curves for correcting image data inputted to an image display unit, a $1^{st}$ correction curve is generated by a $1^{st}$ correction curve generating step based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit. By a $2^{nd}$ correction curve generating step, generated is a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane. By a $3^{rd}$ correction curve generating step, generated is a $3^{rd}$ correction curve which eliminates a difference in color components ratios of a predetermined external illumination.

According to the present invention as described in claim 2, a method for performing an image processing for image data inputted to an image display unit, uses a $1^{st}$ correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit; a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane; and a $3^{rd}$ correction curve which eliminates a difference in color components ratios of a predetermined external illumination.

The present invention as described in claim 3, is the method according to claim 2, wherein an image processing for image data using the $3^{rd}$ correction curve is performed after an image processing for image data using the $1^{st}$ correction curve and the $2^{nd}$ correction curve.

The present invention as described in claim 4, is the method according to claim 2, having a plurality of $1^{st}$ correction curves obtained using different the predetermined luminance values.

The present invention as described in claim 5, is the method according to claim 2, wherein the desired input tone range includes a middle tone range and the vicinity thereof.

The present invention as described in claim 6, is the method according to claim 2, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

The present invention as described in claim 7, is the method according to claim 2, wherein the degree of approximation is adjustable.

The present invention as described in claim 8, is the method according to claim 4, including a $1^{st}$ selection step of selecting one of plural $1^{st}$ correction curves on the basis of a luminance value of external illumination, and wherein the input image data is subjected to an image processing on the basis of the selected $1^{st}$ correction curve.

According to the present invention as described in claim 9, the method according to claim 8, further includes a step of inputting the luminance value of external illumination used in the $1^{st}$ selection step.

According to the present invention as described in claim 10, the method according to claim 8, further includes a step of measuring the luminance value of external illumination used in the $1^{st}$ selection step.

According to the present invention as described in claim 11, an image processing method according to claim 2, uses a plurality of $2^{nd}$ correction curves for a plurality of projection planes.

The present invention as described in claim 12, is an image processing method according to claims 2, wherein the amount of correction of input image data corrected by the $2^{nd}$ correction curve(s) is adjustable.

According to the present invention as described in claim 13, an image processing method according to claim 11, includes a $2^{nd}$ selection step of selecting one $2^{nd}$ correction curve from among the plural $2^{nd}$ correction curves on the basis of a reflection characteristic for each color component reflected by a projection plane, and wherein an image processing is performed for input image data on the basis of the selected $2^{nd}$ correction curve.

According to the present invention as described in claim 14, an image processing method according to claim 13, further includes a step of inputting the reflection characteristic for each color component reflected by the projection plane in the $2^{nd}$ selection step.

According to the present invention as described in claim 15, an image processing method according to claim 13, further include a step of measuring the reflection characteristic for each color component reflected by the projection plane in the $2^{nd}$ selection step.

According to the present invention as described in claim 16, the image processing method according to claim 2, uses a plurality of $3^{rd}$ correction curves for each of plural external illuminations different in color components ratios.

The present invention as described in claim 17, is the image processing method according to claim 2, wherein the difference in color components ratios of the predetermined external illumination is eliminated by offsetting the difference.

The present invention as described in claim 18,, is the image processing method according to claim 17, wherein the amount of the offset is determined by subtracting each color component from an average of color components.

The present invention as described in claim 19, is the image processing method according to claim 17, wherein the amount of the offset is adjustable.

The present invention as described in claim 20, is the image processing method according to claim 16, including a $3^{rd}$ selection step of selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

According to the present invention as described in claim 21, the image processing method according to claim 20, further includes a step of inputting color components ratios of the external illumination in the $3^{rd}$ selection step.

According to the present invention as described in claim 22, the image processing method according to claim 20, further includes a step of measuring color components ratios of the external illumination in the $3^{rd}$ selection step.

The present invention as described in claim 23, is an image processing method according to claim 2, including the step of generating a final correction curve on a basis of the $1^{st}$ correction curve, the $2^{nd}$ correction curve and the $3^{rd}$ correction curve, and wherein the final correction curve is subjected to a rounding process in a low graduation region and in a high graduation region.

The present invention as described in claim 24, is an image processing method according to claim 23, wherein the degree of the rounding process is adjustable.

The present invention as described in claim 25, is an image display unit for performing an image processing for an inputted image data, wherein the image display unit performs the image processing for the inputted data based on the $1^{st}$ correction curve, the $2^{nd}$ correction curve and the $3^{rd}$ correction curve, which are sequentially generated by sequentially repeating the $1^{st}$ correction curve generating step, the $2^{nd}$ correction curve generating step and the $3^{rd}$ correction curve generating step, which are described in claim 1.

According to the present invention as described in claim 26, an image display unit for performing an image processing for an inputted image data, uses: a $1^{st}$ correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit; a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane; and a $3^{rd}$ correction curve which eliminates a difference in color components ratios of a predetermined external illumination.

According to the present invention as described in claim 27, the image display unit according to claim 26, has a plurality of $1^{st}$ correction curves obtained using different the predetermined luminance values.

According to the present invention as described in claim 28, an image processing image display unit according to claim 26, uses a plurality of $2^{nd}$ correction curves for a plurality of projection planes.

According to the present invention as described in claim 29, the image processing image display unit according to claim 26, uses a plurality of $3^{rd}$ correction curves for each of plural external illuminations different in color components ratios.

The present invention as described in claim 30, is the image display unit according to claim 25, wherein an image processing for image data using the $3^{rd}$ correction curve is performed after an image processing for image data using the $1^{st}$ correction curve and the $2^{nd}$ correction curve.

The present invention as described in claim 31, is the image display unit according to claim 25, wherein the desired input tone range includes a middle tone range and the vicinity thereof.

The present invention as described in claim 32, is the image display unit according to claim 25, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

The present invention as described in claim 33, is the image display unit according to claim 25, wherein the degree of approximation is adjustable.

The present invention as described in claim 34, is an image processing image display unit according to claim 25, wherein the amount of correction of input image data corrected by the $2^{nd}$ correction curve(s) is adjustable.

The present invention as described in claim 35, is the image processing image display unit according to claim 25, wherein the difference in color components ratios of the predetermined external illumination is eliminated by offsetting the difference.

The present invention as described in claim 36, is the image processing image display unit according to claim 35, wherein the amount of the offset is determined by subtracting each color component from an average of color components.

The present invention as described in claim 37, is the image processing image display unit according to claim 35, wherein the amount of the offset is adjustable.

According to the present invention as described in claim 38, the image display unit according to claim 27, includes a $1^{st}$ selection unit for selecting one of plural $1^{st}$ correction curves on the basis of a luminance value of external illumination, and wherein the input image data is subjected to an image processing on the basis of the selected $1^{st}$ correction curve.

According to the present invention as described in claim 39, the image display unit according to claim 38, further includes a unit for inputting the luminance value of external illumination used in the $1^{st}$ selection unit.

According to the present invention as described in claim 40, the image display unit according to claim 38, further includes a unit for measuring the luminance value of external illumination used in the $1^{st}$ selection unit.

The present invention as described in claim 41, is an image processing image display unit according to claim 28, including a $2^{nd}$ selection unit for selecting one $2^{nd}$ correction curve from among the plural $2^{nd}$ correction curves on the basis of a reflection characteristic for each color component reflected by a projection plane, and wherein an image processing is performed for input image data on the basis of the selected $2^{nd}$ correction curve.

According to the present invention as described in claim 42, an image processing image display unit according to claim 41, further includes a unit for inputting the reflection characteristic for each color component reflected by the projection plane in the $2^{nd}$ selection unit.

According to the present invention as described in claim 43, an image processing image display unit according to claim 41, further includes a unit for measuring the reflection characteristic for each color component reflected by the projection plane in the $2^{nd}$ selection unit.

The present invention as described in claim 44, is the image processing image display unit according to claim 29, including a $3^{rd}$ selection unit for selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

According to the present invention as described in claim 45, the image processing image display unit according to claim 44, further includes a unit for inputting color components ratios of the external illumination in the $3^{rd}$ selection unit.

According to the present invention as described in claim 46, the image processing image display unit according to claim 44, further includes a unit for measuring color components ratios of the external illumination in the $3^{rd}$ selection unit.

The present invention as described in claim 47, is an image processing image display unit according to claim 25, including the unit for generating a final correction curve on a basis of the $1^{st}$ correction curve, the $2^{nd}$ correction curve and the $3^{rd}$ correction curve, and wherein the final correction curve is subjected to a rounding process in a low graduation region and in a high graduation region.

The present invention as described in claim 48, is an image processing image display unit according to claim 47, wherein the degree of the rounding process is adjustable.

According to the present invention as described in claim 49, a computer-readable medium storing correction curves to perform an image processing for image data inputted to an image display unit, includes: a $1^{st}$ correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit; a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane; and a $3^{rd}$ correction curve which eliminates a difference in color components ratios of a predetermined external illumination.

The present invention as described in claim 50, is a computer-readable medium having a program of instructions for execution by the computer to perform an image processing for image data inputted to an image display unit, wherein the image processing corrects input image data by using: a $1^{st}$ correction curve based on an tone reproduction characteristic in an illuminated surround of the image display unit under illumination of a predetermined luminance value, the tone reproduction characteristic in an illuminated surround having been approximated to an tone reproduction characteristic in a dark surround of the image display unit; a $2^{nd}$ correction curve for eliminating a difference between a reflection characteristic for each color component of an output provided from the image display unit and reflected by a predetermined projection plane and a reflection characteristic for each color component of the output provided from the image display and reflected by a reference projection plane; and a $3^{rd}$ correction curve which eliminates a difference in color components ratios of a predetermined external illumination.

The present invention as described in claim 51, is the computer-readable medium according to claim 50, wherein an image processing for image data using the $3^{rd}$ correction curve is performed after an image processing for image data using the $1^{st}$ correction curve and the $2^{nd}$ correction curve.

According to the present invention as described in claim 52, the computer-readable medium according to claim 50, has a plurality of $1^{st}$ correction curves obtained using different the predetermined luminance values.

The present invention as described in claim 53, is the computer-readable medium according to claim 50, wherein the desired input tone range includes a middle tone range and the vicinity thereof.

The present invention as described in claim 54, is the computer-readable medium according to claim 50, wherein the tone reproduction characteristic in a dark surround and the tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

According to the present invention as described in claim 55, is the computer-readable medium according to claim 51, wherein the degree of approximation is adjustable.

The present invention as described in claim 56, is the computer-readable medium according to claim 52, including a $1^{st}$ selection step of selecting one of plural $1^{st}$ correction curves on the basis of a luminance value of external illumination, and wherein the input image data is subjected to an image processing on the basis of the selected $1^{st}$ correction curve.

According to the present invention as described in claim 57, the computer-readable medium according to claim 56, further includes a step of inputting the luminance value of external illumination used in the $1^{st}$ selection step.

According to the present invention as described in claim 58, the computer-readable medium according to claim 56, further includes a step of measuring the luminance value of external illumination used in the $1^{st}$ selection step.

The present invention as described in claim 59, is an image processing computer-readable medium according to claim 50, which uses a plurality of $2^{nd}$ correction curves for a plurality of projection planes.

The present invention as described in claim 60, is an image processing computer-readable medium according to claim 50, wherein the amount of correction of input image data corrected by the $2^{nd}$ correction curve(s) is adjustable.

The present invention as described in claim 61, is an image processing computer-readable medium according to claim 59, including a $2^{nd}$ selection step of selecting one $2^{nd}$ correction curve from among the plural $2^{nd}$ correction curves on the basis of a reflection characteristic for each color component reflected by a projection plane, and wherein an image processing is performed for input image data on the basis of the selected $2^{nd}$ correction curve.

According to the present invention as described in claim 62, an image processing computer-readable medium according to claim 61, further includes a step of inputting the reflection characteristic for each color component reflected by the projection plane in the $2^{nd}$ selection step.

According to the present invention as described in claim 63, an image processing computer-readable medium according to claim 61, further includes a step of measuring the reflection characteristic for each color component reflected by the projection plane in the $2^{nd}$ selection step.

According to the present invention as described in claim 64, the image processing computer-readable medium according to claim 50, uses a plurality of $3^{rd}$ correction curves for each of plural external illuminations different in color components ratios.

The present invention as described in claim 65, is the image processing computer-readable medium according to claim 50, wherein the difference in color components ratios of the predetermined external illumination is eliminated by offsetting the difference.

The present invention as described in claim 66, is the image processing computer-readable medium according to claim 65, wherein the amount of the offset is determined by subtracting each color component from an average of color components.

The present invention as described in claim 67, is the image processing computer-readable medium according to claim 65, wherein the amount of the offset is adjustable.

The present invention as described in claim 68, is the image processing computer-readable medium according to claim 64, including a $3^{rd}$ selection step of selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

According to the present invention as described in claim 69, the image processing computer-readable medium according to claim 68, further includes a step of inputting color components ratios of the external illumination in the $3^{rd}$ selection step.

According to the present invention as described in claim 70, the image processing computer-readable medium according to claim 68, further includes a step of measuring color components ratios of the external illumination in the $3^{rd}$ selection step.

The present invention as described in claim 71, is an image processing computer-readable medium according to claim 50, including the step of generating a final correction curve on a basis of the $1^{st}$ correction curve, the $2^{nd}$ correction curve and the $3^{rd}$ correction curve, and wherein the final correction curve is subjected to a rounding process in a low graduation region and in a high graduation region.

The present invention as described in claim 72, is an image processing computer-readable medium according to claim 71, wherein the degree of the rounding process is adjustable.

DESCRIPTION OF THE PREFERRED EMBODIMENT

Preferred embodiments of the present invention will be described hereinafter with reference to the drawings.

First Embodiment

System Configuration

Figure 1:
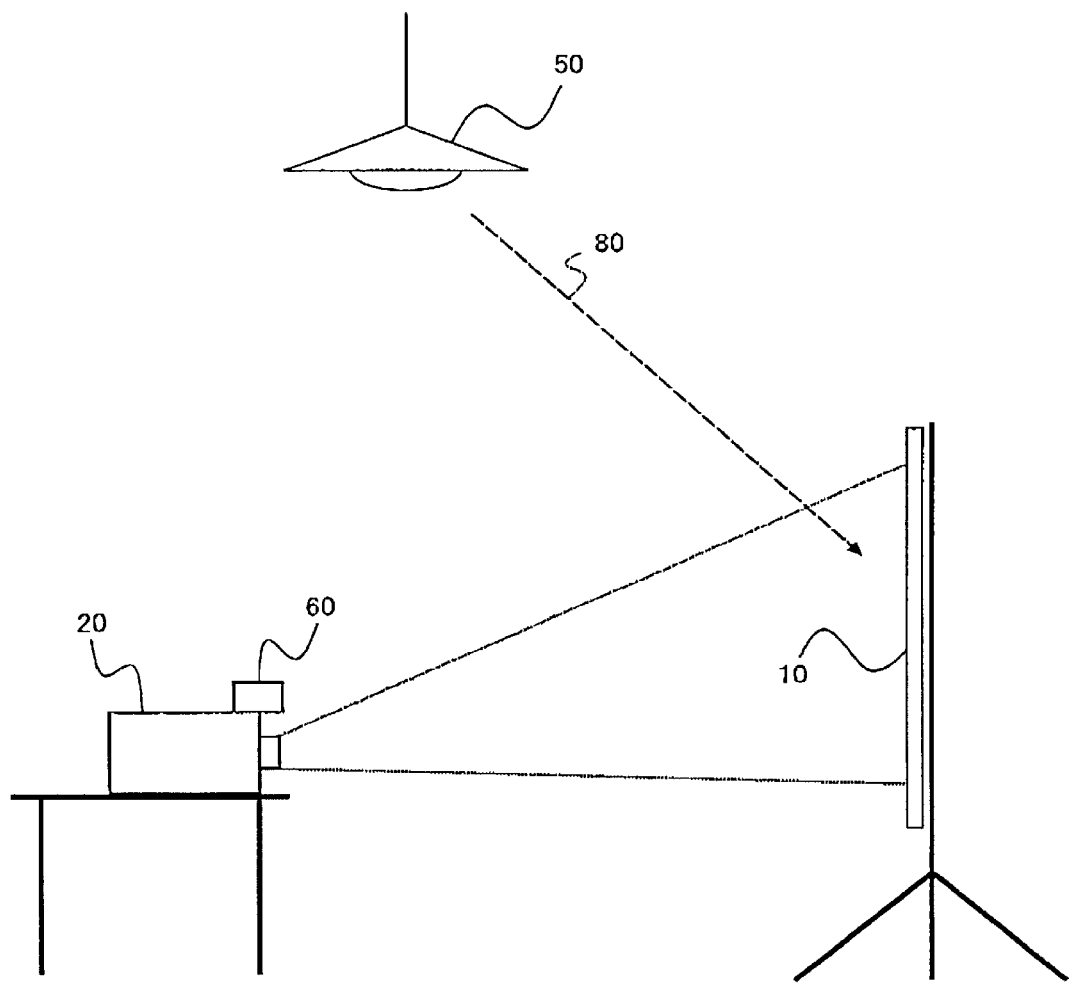
FIG. 1 is a schematic explanatory diagram of a system using a projector 20 according to an embodiment of the present invention.

FIG. 1 is a schematic explanatory diagram of a system which used a projector 20 as an image display unit according to an embodiment of the present invention. As examples of the image display unit according to the present invention are also included CRT and liquid crystal display in addition to the projector.

A predetermined image is projected from a projector 20 disposed approximately in front of a screen 10.

In this case, the visibility of an image projected on the screen 10 differs greatly depending on the type of screen 10 or an external illumination 80 produced from a lighting device 50. For example, even in the case of displaying the same white, the white may look yellowish depending on the type of the screen 10, or the white looks like a light white or a dark white depending on the intensity of the external illumination 80.

Figure 2:
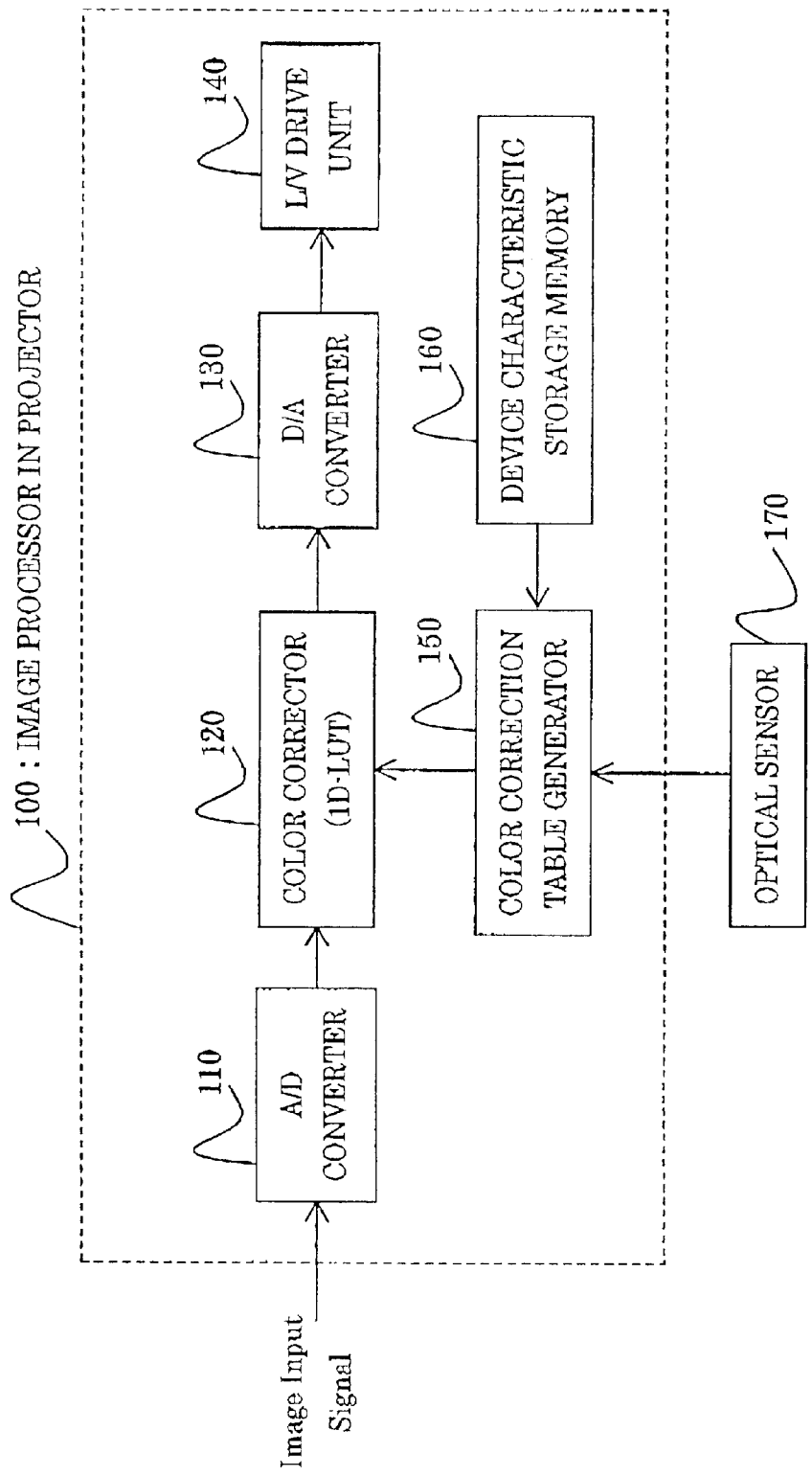
FIG. 2 is a functional block diagram of an image processor 100 used in the projector 20 of the first embodiment.

FIG. 2 is a functional block diagram of an image processor 100 installed in the projector 20 according to the first embodiment of the present invention.

The image processor 100 in the projector of this first embodiment is provided with an A/D converter 110 for converting an analog image input signal into a digital signal, a color corrector 120 which applies a one-dimensional color correction table to RGB image input signals to effect a desired color correction, an D/A converter 130 for converting a digital signal into an analog signal, a L/V (light valve) drive unit 140 for actuating a liquid crystal light valve to make a projection display of image, a device characteristic storage memory 160 for the storage of projector characteristic, an optical sensor 170 for measuring the luminance of light emitted from the projector and reflected by the screen and light from the external illumination reflected by the screen, and a color correction table generator 150 for generating a color correction table taking the influence of external illumination into account and on the basis of the device characteristics stored in the device characteristics storage memory 160 and a colorimetric value provided from the optical sensor 170.

In the projector according to the present invention, an analog image input signal fed from a personal computer for example is converted to a digital image signal by the A/D converter 110. The digital image signal thus converted from the analog signal is subjected to a desired color correction by the color corrector 120 taking the influence of external illumination into account and with reference to the color correction table generated by the color correction table generator 150. The digital image signal thus color-corrected is converted to an analog signal by the D/A converter 130. On the basis of the analog signal thus converted from the digital signal the L/V drive unit 140 actuates the liquid crystal light valve to make a projection display of image.

Operation of the Image Processor 100

Figure 3:
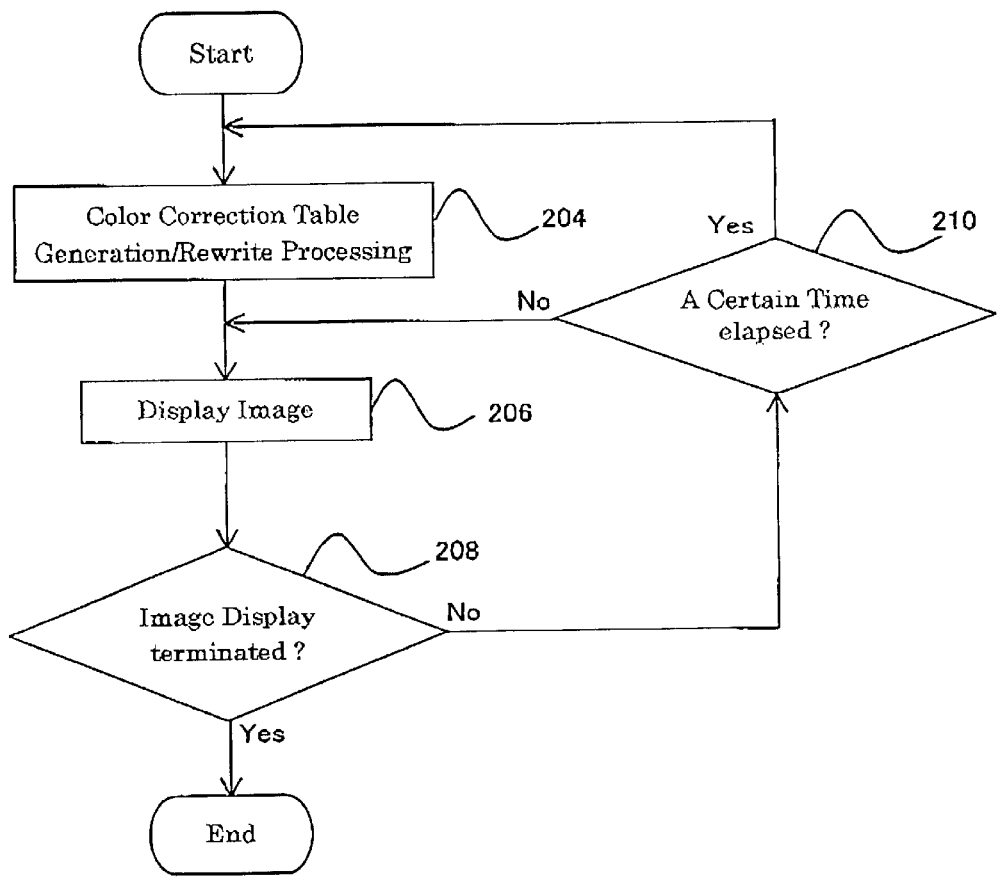
FIG. 3 is a flow chart for explaining the operation of the image processor 100 in the projector 20 of the first embodiment.

Next, with reference to FIG. 3, a description will be given about the operation of the image processor 100 in the projector 20 of this first embodiment. Processings such as a color correction table generation/rewrite processing performed by the image processor 100, which will be described below, are carried out by executing an image processing program stored in a program storage unit (not shown) provided in the projector 20. The program storage unit constitutes a medium which stores the image processing program. The image processing program itself is also included in the scope of the present invention.

First, when the use of the projector 20 according to the present invention is started, there is performed a color correction table generation/rewrite processing by the color correction table generator 150 (step 204). As to the color correction table generation/rewrite processing, it will be described below in detail with reference to FIG. 4.

After the color correction table generation/rewrite processing, there is made image display on the basis of the image signal color-corrected by the color corrector 120 and with reference to the rewritten color correction table (step 206). If the image display is not terminated (step 208, No) and if a certain time has not elapsed from the end of the last-time color correction table generation/rewrite processing (step 210, No), the state of image display in step 206 continues. On the other hand, if the display of image is not terminated (step 208, No) and a certain time has elapsed from the termination of the last-time color correction table generation/rewrite processing (step 210, Yes), the color correction table generation/rewrite processing is again performed taking into account the case where the brightness of external illumination changes with the lapse of time (step 204) and there is made image display (step 206). According to the present invention, since the color correction table is rewritten at every certain time taking the brightness of external illumination also into account, an appropriate color reproduction is ensured even if the brightness of external illumination changes.

In the case where the display of image is terminated, for example by turning OFF a power supply of the projector (step 208, Yes), the processing is ended.

Color Correction Table Generation/Rewrite Processing

Next, with reference to FIG. 4, a description will be given about the color correction table generation/rewrite processing (the processing in step 204 in FIG. 3) which is performed by the color correction table generator 150 in the projector 20 of the first embodiment.

In the color correction table generation/rewrite processing, a correction curve calculation processing 1 (a correction with respect to change in brightness of external illumination) (step 222), a correction curve calculation processing 2 (a correction with respect to change in color of projection plane) (step 223), and a correction curve calculation processing 3 (a correction with respect to change in color of external illumination) (step 224) are respectively performed. Next, three steps of correction curve rounding processes 1, 2 and 3 are performed (steps 225, 226 and 227). The correction curve calculation processings 1, 2 and 3 and the correction curve rounding processes 1, 2 and 3 will be explained hereinafter.

Next, on the basis of the correction curves thus calculated, there is generated a new one-dimensional color correction table. Then, the one-dimensional color correction table, which is referred to in the color corrector 120, is rewritten by the newly generated one-dimensional color correction table (step 228), and the processing flow returns to step 206.

Correction Curve Calculation Processing 1 (Correction with respect to change in brightness of external illumination)

Figure 5:
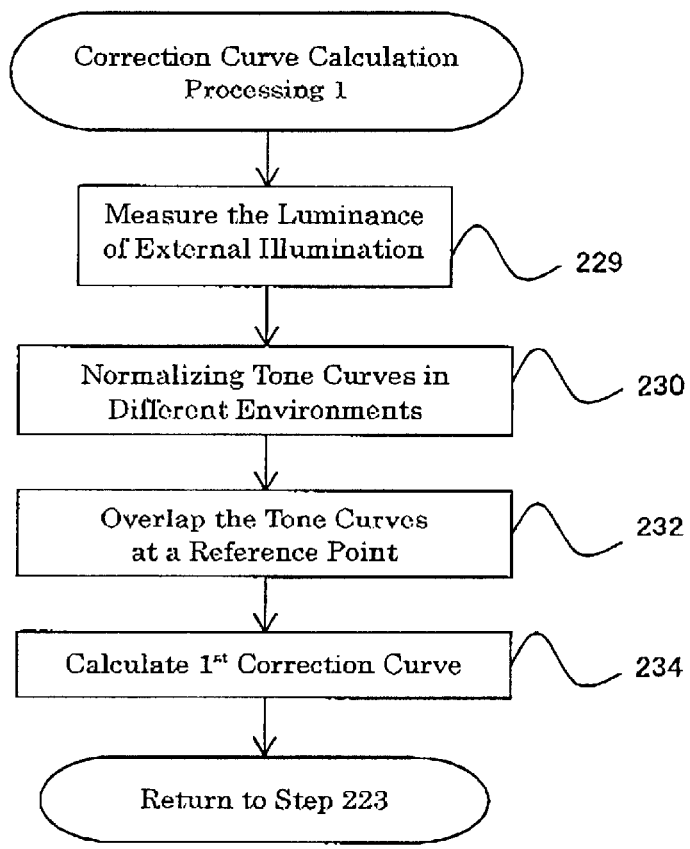
FIG. 5 is a flow chart for explaining a correction curve calculation processing 1 (a correction with respect to a change in brightness of external illumination)

Next, a description will be given about a correction curve calculation processing 1 with reference to FIG. 5.

In the color correction table generation/rewrite processing 1, the projector (image display unit) 20 is caused to output white (R=G=B=255 gray scales) in a dark surround beforehand, the output light is allowed to be reflected by the screen 10, and the reflected light is measured by the optical sensor 170.

In the color correction table generation/rewrite processing 1, with no output from the projector 20, the luminance of external illumination light reflected by the screen 10 is measured (step 229).

In the correction curve calculation processing, first tone curves are normalized in different environments (step 230). Correction curves in all of W (white), R (red), G (green), and B (blue) are the same curves, and therefore, in this embodiment a correction curve is calculated with respect to W as an example. tone curves in different environments (in a dark surround and in an illuminated surround) are assumed as follows. The "γ" represents a tone curve characteristic of the projector concerned. The value of γ is obtained by actually measuring the tone curve characteristic of the projector concerned and it is suitable to use a mean value as the value of γ. In this embodiment, γ is set equal to 2.2 as an example.

In a dark surround:

$$Fd(Din) = Yw \cdot Din^\gamma \quad (1)$$

Figure 6:
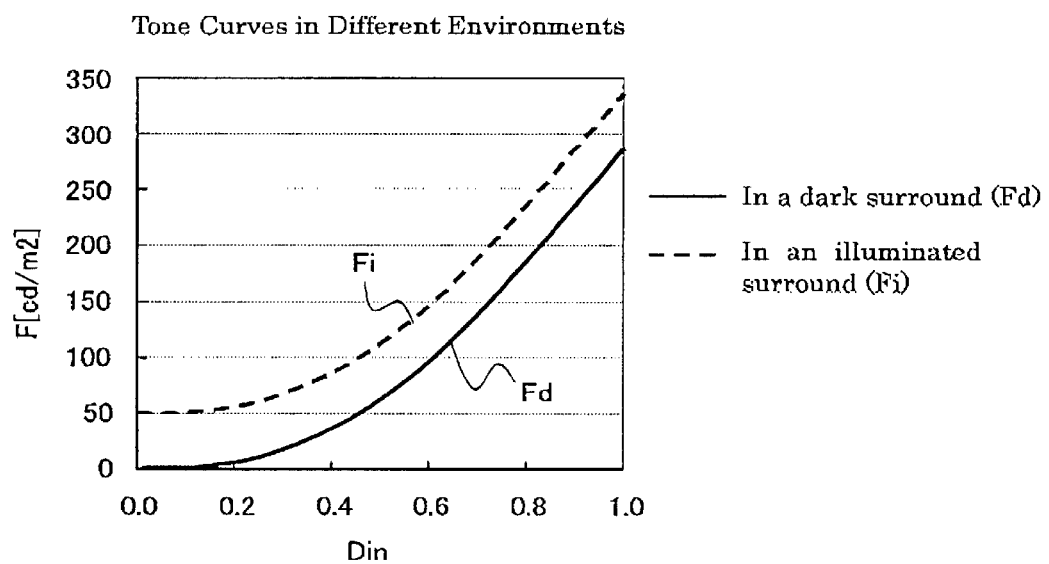
FIG. 6 is a graph showing tone curves in different environments.

In an illuminated surround:

$$Fi(Din) = Yw \cdot Din^\gamma + Yi \quad (2)$$

tone curves in different environments are shown in FIG. 6.

In the above equations, F represents a total luminance of lights reflected by the screen, Din represents normalized values 0–1 by standardizing digital input values (0–255 gray scales) of RGB, Yw represents the luminance of white in the projection, and Yi represents the luminance of illumination. Then, the equations (1) and (2) are normalized under the assumption that the eyes adapt themselves to luminances (Yw in a dark surround, Yw+Yi in an illuminated surround) detected when the projector outputs white in different environments. That is, the equations (1) and (2) are normalized so that the luminance (Yw in a dark surround, Yw+Yi in an illuminated surround) detected when the projector outputs white in each of different environments becomes 1. More specifically:

In a dark surround:

$$F'd(Din) = Fd(Din)/Yw = Din^\gamma \quad (3)$$

In an illuminated surround:

$$F'i(Din) = Fi(Din)/(Yw+Yi) = (Yw \cdot Din^\gamma + Yi)/(Yw+Yi) \quad (4)$$

Figure 7:
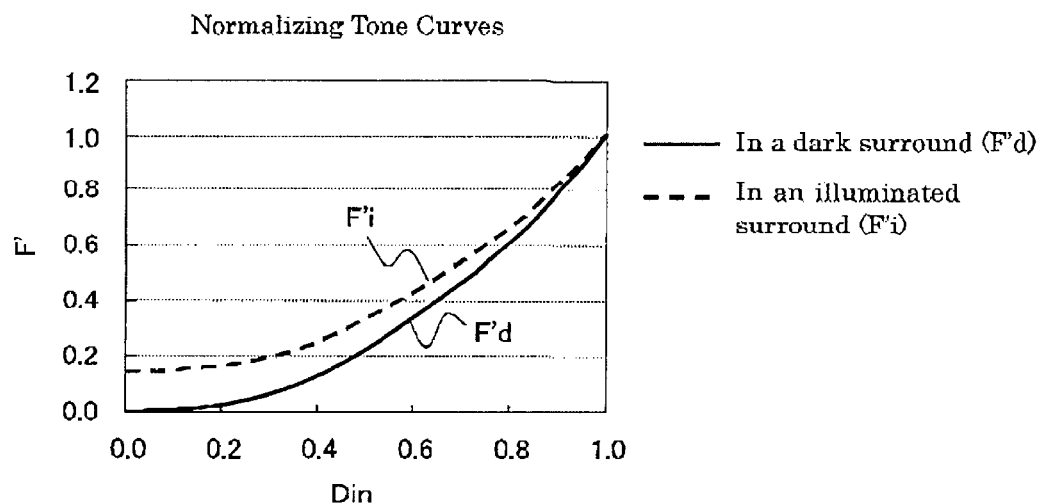
FIG. 7 is a graph showing normalized tone curves in different environments.

Normalized tone curves in different environments are shown in FIG. 7.

Figure 8:
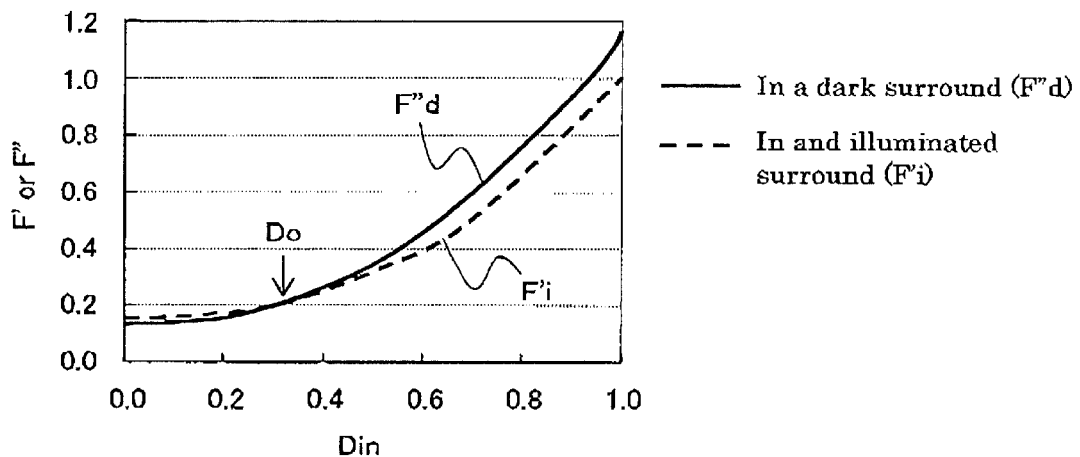
FIG. 8 is a graph showing a state in which normalized tone curves in different environments are overlapped together at a reference point Do.

Next, the tone curves are overlapped each other at a reference point Do (step 232). As shown in FIG. 8, F'd(Din) is shifted in parallel in F' axis direction by only {F'i(Do)−F'd(Do)} so that F'd(Din) takes the same value as F'i(Din). More specifically:

$$F''d(Din) = F'd(Din) + \{F'i(Do) - F'd(Do)\}$$
$$= F'd(Din) - F'd(Do) + F'i(Do)$$

If the equations (3) and (4) are used:

$$F''d(Din) = Din^\gamma - Do^\gamma + (Yw \cdot Do^\gamma + Yi)/(Yw+Yi) \quad (5)$$

Then, using the equation (5), a correction curve is calculated (step 234).

Thus, in this embodiment, as shown in FIG. 8, a $1^{st}$ correction curve is formed so that an output value of the correction curve in an illuminated surround coincides with an output value of the correction curve in a dark surround in the vicinity of the reference point Do.

Then, the change in color of output image, which depends on whether an external illumination is present or not, is diminished by correcting input tone values so that a relative contrast (gradient of tone curve) in the vicinity of the reference point Do does not change depending on whether an external illumination is present or not.

The above can be expressed by the following equation:

$$F'i(Dout) = F''d(Din) \quad (6)$$

where Dout represents input tone values after correction.

Substitution of equations (4) and (5) into equation (6) gives:

$$(i\ Yw \cdot Dout^\gamma + Yi)/(Yw+Yi) = Din^\gamma - Do^\gamma + (Yw \cdot Do^\gamma + Yi)/(Yw+Yi)$$

Thus, $$Dout1 = [(1+Yi/Yw)Din^\gamma - (Yi/Yw)Do^\gamma]^{1/\gamma} \quad (7)$$

Figure 9:
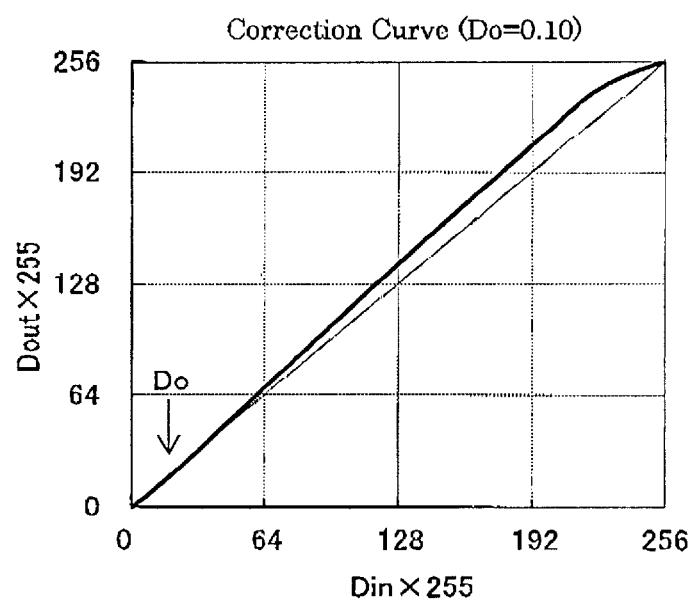
FIG. 9 is a graph (1) showing an example of a correction curve obtained by changing the value of Do.
Figure 10:
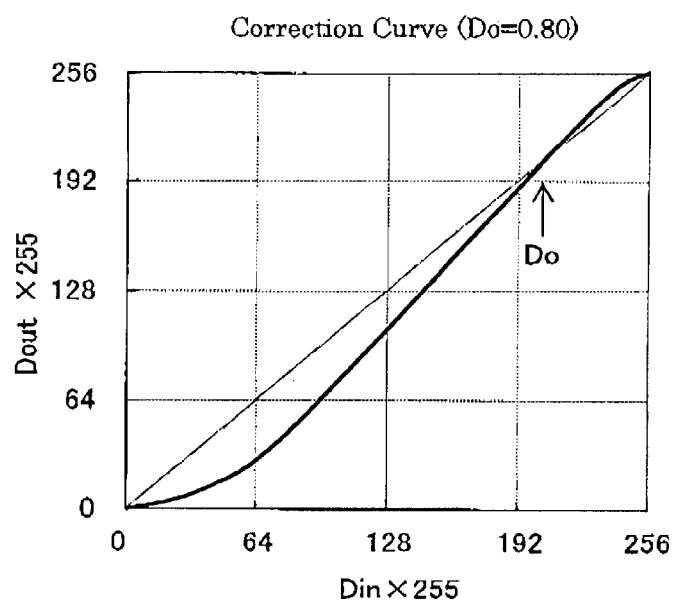
FIG. 10 is a graph (2) showing an example of a correction curve obtained by changing the value of Do.

The $1^{st}$ correction curve changes variously by changing the gradation Do which serves as a main gradation in correcting a lowering of contrast caused by illumination. Generally, if the value of Do is small, there is obtained such a $1^{st}$ correction curve as shown in FIG. 9, and although the gradation in a low gray scale region is improved, the projection screen looks whitish, affording a light tone. On the other hand, if the value of Do is made large, there is obtained such a $1^{st}$ correction curve as shown in FIG. 10, in which the projection screen is blackish as a whole and the gradation change in the low gray scale region further decreases (what is called collapse of the low gray scale region becomes conspicuous). By setting the value of Do at an appropriate value it is possible to make such a correction as sharpness is most emphasized with little change in the entire brightness of projected image as compared with that before correction. As a result of experimental evaluation it turned out that a Do value near a middle gray scale ($0.25 \leq Do \leq 0.50$ or so) was suitable.

Figure 11:
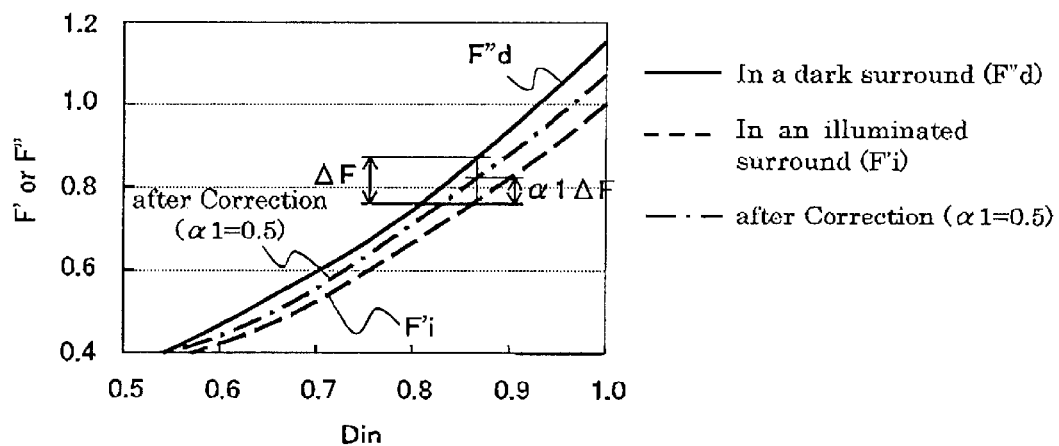
FIG. 11 is a graph for explaining how to adjust the amount α1 of correction of a correction curve.

Further, as shown in FIG. 11, the amount of correction can be adjusted by multiplying the amount of correction ΔF by α1 (0≦α1≦1). This is for preventing am unnatural image reproduction caused by an excessive correction. The equation (7) of Dout1 in adjusting the amount of correction becomes as follows:

$$Dout1=[(1+α1Yi/Yw)Din^γ-(α1Yi/Yw)Do^γ]^{1/γ} \quad (8)$$

Therefore, the 1$^{st}$ correction curves with respect to RGB colors are as follows:

$$D_Rout1=[(1+α1·Yi/Yw)D_Rin^γ-(α1·Yi/Yw)Do^γ]^{1/γ} \quad (9)$$

$$D_Gout1=[(1+α1·Yi/Yw)D_Gin^γ-(α1·Yi/Yw)Do^γ]^{1/γ} \quad (10)$$

$$D_Bout1=[(1+α1·Yi/Yw)D_Bin^γ-(α1·Yi/Yw)Do^γ]^{1/γ} \quad (11)$$

Multiplying the amount of correction by α1 eventually corresponds to multiplying the luminance of illumination, Yi, by α1. It is preferable that the value of α1 be within the range of 0.8≦α1≦1.

Figure 4:
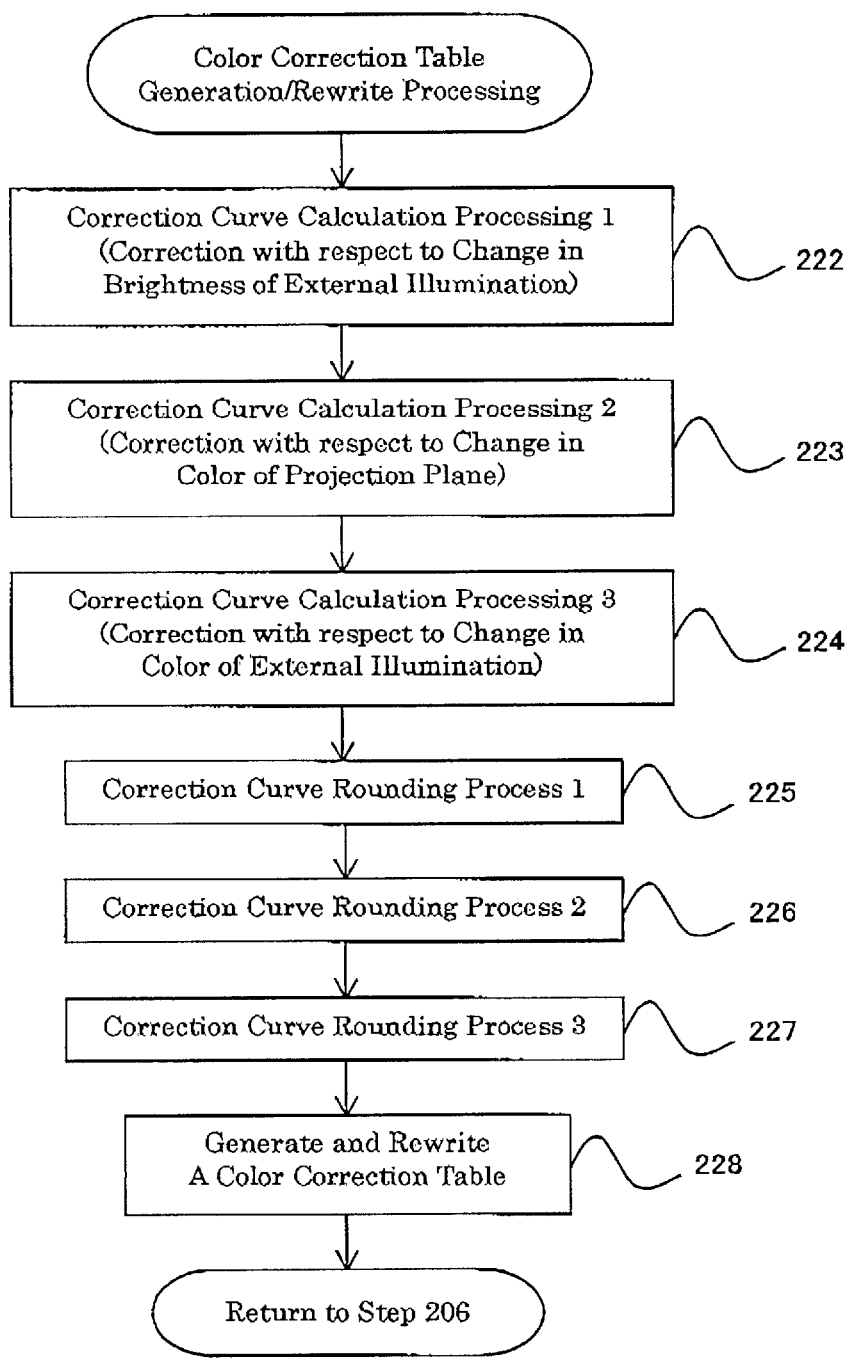
FIG. 4 is a flow chart for explaining a color correction table generation/rewrite processing executed by a color correction table generator 150 in the projector 20 of the first embodiment.

As shown in the above equations (9)–(11), the 1$^{st}$ correction curves are calculated (step 234), the processing flow returns to step 223 of FIG. 4, and, therefore, a correction curve calculation processing 2 is performed.

Figure 12:
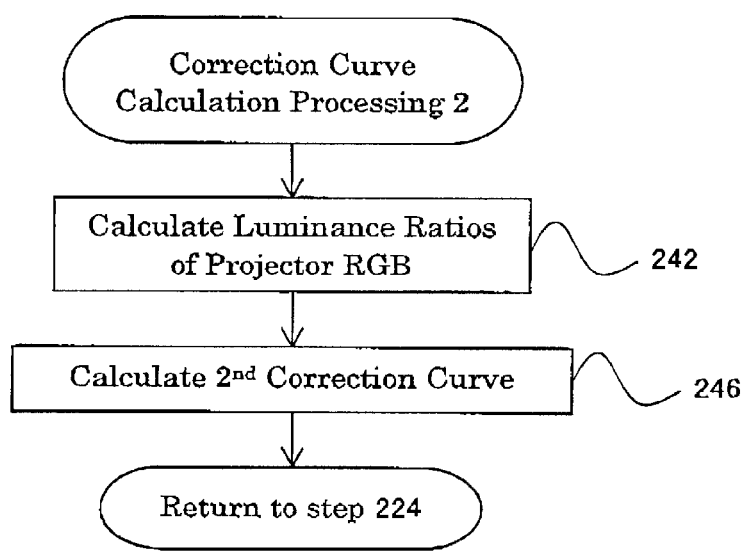
FIG. 12 is a flow chart for explaining a correction curve calculation processing 2 (a correction with respect to a change in color of projection plane)

Correction Curve Calculation Processing 2
(Correction with respect to a change in color of projection plane);

Next, with reference to FIG. 12, a description will be given about the correction curve calculation processing 2.

First, in the correction curve calculation processing 2, before using the projector 20 according to the present invention, R (red), G (green), B (blue), and bk (black) colors are outputted to a reference projection plane from the projector (image display unit) 20 in a dark surround and a luminance value of reflected light of each such color output reflected by the reference projection plane is measured by the optical sensor 170 and is stored in the device characteristic storage memory 160. As the reference projection plane there may be selected a projection plane whose reflectance in the visible light region is close to 1, such as a standard diffusion plate.

Before using the projector 20 according to the present invention, in a dark surround, R (red), G (green), B (blue), and bk (black) colors are outputted to a projection plane to be corrected and a luminance value of reflected light of each such color output reflected by the projection plane is measured by the optical sensor 170.

In the correction curve calculation processing 2, first, luminance ratios of RGB colors on projection planes are calculated on the basis of the measured values (a luminance value of reflected light of R (red), G (green), B (blue), and bk (black) colors reflected by the reference projection plane, and a luminance value of reflected light of R (red), G (green), B (blue), and bk (black) colors reflected by the projection plane to be corrected) (step 242), which calculation is performed in accordance with the following equations:

$$y_R=(Y_R-Ybk)/(Y_G-Ybk) \quad (12)$$

$$y_G=(Y_G-Ybk)/(Y_G-Ybk)=1 \quad (13)$$

$$y_B=(Y_B-Ybk)/(Y_G-Ybk) \quad (14)$$

In the above equations, $Y_R$, $Y_G$, $Y_B$, and Ybk represent luminances of R, G, B, and bk colors in the projector and $y_R$, $y_G$, and $y_B$ represent luminance ratios of RGB. In this case, $y_G$ is always 1 because the ratios are based on the luminance of G. Luminance ratios $y_{RO}$, $y_{GO}$, and $Y_{BO}$ of RGB on the reference projection plane are also calculated in the same manner.

Next, a 2$^{nd}$ correction curve is calculated (step 246). Primary colors (RGB) in the projector are not influenced by a change in chromaticity caused by a change of projection plane in comparison with secondary and tertiary colors. Therefore, if the luminance ratios $y_R$, $y_G$, and $y_B$ of the projection plane concerned are corrected so as to coincide with the luminance ratios $y_{RO}$, $y_{GO}$, and $y_{BO}$ of the reference projection plane, a change in chromaticity caused by a difference of projection plane is corrected in all colors. If digital input values of RGB before correction are normalized in the range of 0 to 1 as $D_R$in 2, $D_G$in 2, and $D_B$in 2, respectively, and digital input values of RGB after correction are normalized in the range of 0 to 1 as $D_R$out2, $D_G$out2, and $D_B$out2, respectively, there are obtained the following correction curve equations:

$$D_Rout2=[y_R'/\max(y_R', y_G', y_B')]^{1/γ} \times D_Rin2, y_R'=y_{RO}/y_R \quad (15)$$

$$D_Gout2=[y_G'/\max(y_R', y_G', y_B')]^{1/γ} \times D_Gin2, y_G'=y_{GO}/y_G=1 \quad (16)$$

$$D_Bout2=[y_B'/\max(y_R', y_G', y_B')]^{1/γ} \times D_Bin2, y_B'=y_{BO}/y_B \quad (17)$$

In the above equations, $\max(y_R', y_G', y_B')$ represent maximum values of $y_R'$, $y_G'$, and $y_B'$, respectively. In this way, a change in chromaticity caused by a difference of projection plane can be corrected colorimetrically.

It is thus possible to correct colorimetrically a change in chromaticity caused by a difference of projection plane, but in case of adjusting the amount of correction, α3 (0<α3<1), taking the adaptability of the human eyes and the effect of contrast into account, there are obtained the following correction curve equations:

$$D_Rout2=[1-α3\{1-y_R'/\max(y_R', y_G', y_B')\}]^{1/γ} \times D_Rin2 \quad (18)$$

$$D_Gout2=[1-α3\{1-y_G'/\max(y_R', y_G', y_B')\}]^{1/γ} \times D_Gin2 \quad (19)$$

$$D_Bout2=[1-α3\{1-y_B'/\max(y_R', y_B', y_G')\}]^{1/γ} \times D_Bin2 \quad (20)$$

Here,
ΔRgain=$y_R'$/max($y_R'$, $y_G'$, $y_B'$)
ΔGgain=$y_G'$/max($y_R'$, $y_G'$, $y_B'$)
ΔBgain=$y_B'$/max($y_R'$, $y_G'$, $y_B'$) Then, the equations (18)–(20) are expressed as follows:

$$D_Rout2=\{1-α3(1-ΔRgain)\}^{1/γ} \times D_Rin2 \quad (21)$$

$$D_Gout2=\{1-α3(1-ΔGgain)\}^{1/γ} \times D_Gin2 \quad (22)$$

$$D_Bout2=\{1-α3(1-ΔBgain)\}^{1/γ} \times D_Bin2 \quad (23)$$

If the color of the projection plane obtained by measurement is corrected 100% (α3=1), an exact correction is performed colorimetrically. In the presence of an external illumination, however, since the color of the projection plane is present around a projected image, the correction looks as if it were stronger than the actual correction clue to a color contrast between the projected image and the projection plane and the effect of the eyes'adaptability to the external illumination. The amount of correction is adjusted to eliminate such a phenomenon. It is necessary that the amount of correction, α3, be adjusted while the evaluation of image is made actually under each environment. The value of α3 is preferably in the range of 0.5 to 1.0.

As shown in the above equations (21)–(23), the 2$^{nd}$ correction curve is calculated (step 246), the processing flow returns to step 224 of FIG. 4, and then, the correction curve calculation processing 3 is performed.

Here, the correction curve calculation processing 1 and the correction curve calculation processing 2 are the processes for relatively correcting inputted values. Namely, with respect to the equations (9)–(11) for the 1$^{st}$ correction curve and the equations (21)–(23) for the 2$^{nd}$ correction curve, the output values are obtained by multiplying the inputted values by correction parameters. Therefore, the order of the correction curve calculation processing 1 and the correction curve calculation processing 2 can be exchanged. Namely, Step 222 of FIG. 4 and Step 223 of FIG. 4 can be exchanged.

Correction Curve Calculation Processing 3

Figure 13:
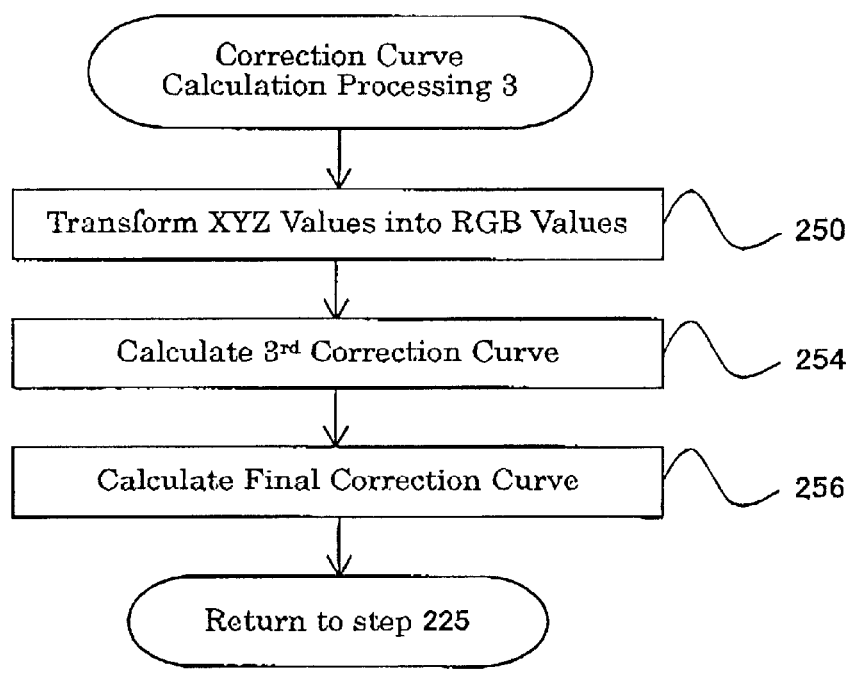
FIG. 13 is a flow chart for explaining a correction curve calculation processing 3 (a correction with respect to a change in color of external illumination)

(Correction with respect to a change in color of external illumination);

Next, with reference to FIG. 13, a description will be given about the correction curve calculation processing 3.

In the correction curve calculation processing 3, R (red), G (Green), B (blue), and bk (black) are outputted beforehand from the projector (image display unit) 20 in a dark surround, then XYZ values of reflected lights obtained by reflection of those color outputs from the screen are measured with an optical sensor 170 and are stored in the device characteristic storage memory 160. In the absence of output from the projector 20, XYZ values of reflected light of the external illumination from the screen 10 are measured.

In the correction curve calculation processing 3, first, the measured values (the XYZ values of the colors of the projector) are transformed into RGB values of the projector (step 250). In this embodiment, for representing the color of the external illumination in terms of RGB values, a matrix M for the transformation between the projector RGB values and XYZ values is determined from the XYZ values of the colors of the projector. The matrix M and transformation expressions are as follows:

$$\begin{pmatrix} X \\ Y \\ Z \end{pmatrix} = \begin{pmatrix} X_{bk} \\ Y_{bk} \\ Z_{bk} \end{pmatrix} + M \begin{pmatrix} r \\ g \\ b \end{pmatrix} \quad (24)$$

$$M = \begin{pmatrix} X_R - X_{bk} & X_G - X_{bk} & X_B - X_{bk} \\ Y_R - Y_{bk} & Y_G - Y_{bk} & Y_B - Y_{bk} \\ Z_R - Z_{bk} & Z_G - Z_{bk} & Z_B - Z_{bk} \end{pmatrix} \quad (25)$$

$$\begin{pmatrix} r \\ g \\ b \end{pmatrix} = \begin{pmatrix} D_R^\gamma \\ D_G^\gamma \\ D_B^\gamma \end{pmatrix} \quad (26)$$

In the above expressions, Xc, Yc, and Zc (c=R, G, B, bk) represent XYZ values of the colors R, G, B, and bk in the projector, $D_R$, $D_G$, and $D_B$ represent normalized values obtained by standardizing digital input values (0–255) of RGB into the range from 0 to 1, and γ represents a tone curve characteristic of the projector. As explained regarding the correction curve calculation processing 1, with respect to the value of γ, it is suitable to actually measure tone curve characteristic values of the projector and use a mean value thereof. In this embodiment, γ is set at 2.2 as an example.

If XYZ values of illumination are assumed to be Xi, Yi, and Zi, RGB values, $r_i$, $g_i$, and $b_i$ in case of representing the illumination color as a mixed color of RGB in the projector are as follows;

$$\begin{pmatrix} r_i \\ g_i \\ b_i \end{pmatrix} = M^{-1} \begin{pmatrix} X_i \\ Y_i \\ Z_i \end{pmatrix} \quad (27)$$

Next, a 3$^{rd}$ correction curve is calculated by using $r_i$, $g_i$, and $b_i$ (step 254). Reproduction of a completely equal color is realized by subtracting $r_i$, $g_i$, and $b_i$ obtained in the expression (27) as offset from the RGB outputs in the projector. But this method is not a practical method because the projector gradation collapses largely.

Figure 14:
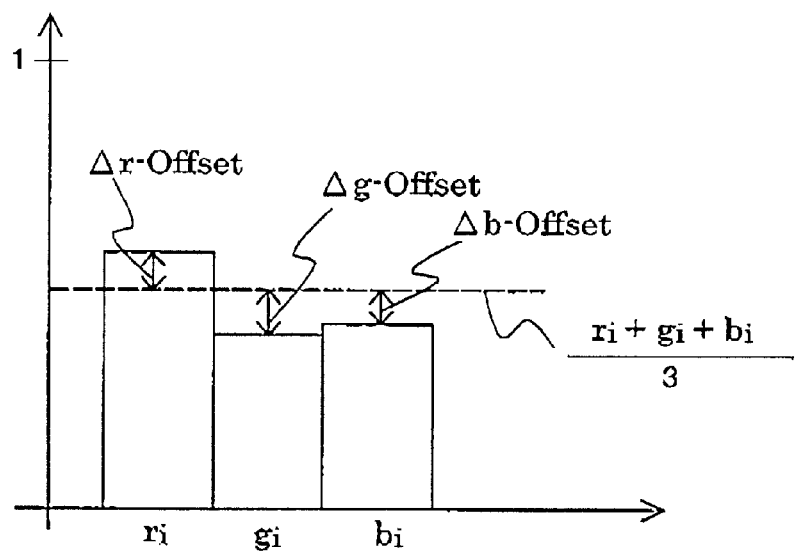
FIG. 14 is a diagram for explaining the principle of the 3$^{rd}$ correction curve.

In view of the above point, in this embodiment there is adopted such a method as shown in FIG. 14 in which differences ΔRoffset, ΔGoffset, and ΔBoffset from a means value of $r_i$, $g_i$, and $b_i$ are subtracted as offset. Therefore, the color generated by superimposing the offset color on the color of illumination corresponds to that of gray of the projector.

In this way, it is colorimetrically possible to correct the influence of the illumination color, but in case of adjusting the amount of oil correction while taking into account the adaptability of the human eyes and the effect of contrast, the values of ΔRoffset, ΔGoffset, and ΔBoffset are multiplied by α2(0<α2<1). If 100% (α2=1) correction is applied to the illumination color obtained by measurement, there is made a proper correction colorimetrically, but an unnatural image reproduction may result due to an overcorrection. The amount of correction is adjusted for eliminating this phenomenon. It is necessary that the amount of correction α2 be adjusted while making image evaluation actually in each environment. As the value of α2, a value in the range of 0.2 to 0.5 is preferable.

The above correction processing is represented by the following expressions, provided only expressions of R will be given for the simplification of explanation. Here, r, g, b represent the RGB outputs of the projector, and r', g', b' represent the RGB outputs of the projector after the correction processing. Namely, on the basis of the equation (26), by adjusting the R output of the projector: $r(D_R)(=D_R{}^\gamma)$ . . . (28) with using the amount of correction α2, the R output of the projector after the correction: $r'(D_R)$ is represented by the following expressions:

$$r'(D_R)=D_R{}^\gamma - \alpha 2 \Delta R \text{ offset} \quad (29)$$

$$\Delta R \text{ offset}=r_i-(r_i+g_i+b_i)/3$$

If $D_R$in3 represents inputted value before correction, and if $D_R$out represents inputted value after correction, the 3$^{rd}$ correction curve is represented by the following expression:

$$r(D_R\text{out})=r'(D_R\text{in}3) \quad (30)$$

By using the equations (29) and (30), the 3$^{rd}$ correction curve is represented by the following expression:

$$D_R\text{out}=(D_R\text{in}3^\gamma - \alpha 2 \Delta R \text{ offset})^{1/\gamma} \quad (31)$$

In the same way, $D_G$out and $D_B$out are represented by the following expressions:

$$D_G\text{out}=(D_G\text{in}3^\gamma - \alpha 2 \Delta G \text{ offset})^{1/\gamma} \quad (32)$$

$$D_B\text{out}=(D_B\text{in}3^\gamma - \alpha 2 \Delta B \text{ offset})^{1/\gamma} \quad (33)$$

A final correction curve is obtained by connecting the 1$^{st}$ correction curve, the 2$^{nd}$ correction curve and the 3$^{rd}$ correction curve, which are calculated as explained before. Namely, if with respect to the equations (9)–(11) and the equations (21)–(23)

$D_R\text{in2}=D_R\text{out1}$ $D_G\text{in2}=D_G\text{out1}$ $D_B\text{in2}=D_B\text{out1}$ and if with respect to the equations (21)–(23) and the equations (31)–(33)

$D_R\text{in3}=D_R\text{out2}$ $D_G\text{in3}=D_G\text{out2}$ $D_B\text{in3}=D_B\text{out2}$ the final correction curves are represented by the following expressions:

$$D_R\text{out}=[\{1-\alpha 3(1-\Delta R\text{gain})\}\times\{(1+\alpha 1\cdot Yi/Yw)D_R\text{in}^\gamma-(\alpha 1\cdot Yi/Yw)Do^\gamma\}-\alpha 2\Delta R\text{ offset})]^{1/\gamma} \quad (34)$$

$$D_G\text{out}=[\{1-\alpha 3(1-\Delta G\text{gain})\}\times\{(1+\alpha 1\cdot Yi/Yw)D_G\text{in}^\gamma-(\alpha 1\cdot (Yi/Yw)Do^\gamma\}-\alpha 2\Delta G\text{ offset})]^{1/\gamma} \quad (35)$$

$$D_R\text{out}=[\{1-\alpha 3(1-\Delta B\text{gain})\}\times\{(1+\alpha 1\cdot Yi/Yw)D_B\text{in}^\gamma-(\alpha 1\cdot Yi/Yw)Do^\gamma\}-\alpha 2\Delta B\text{ offset})]^{1/\gamma} \quad (36)$$

Figure 15:
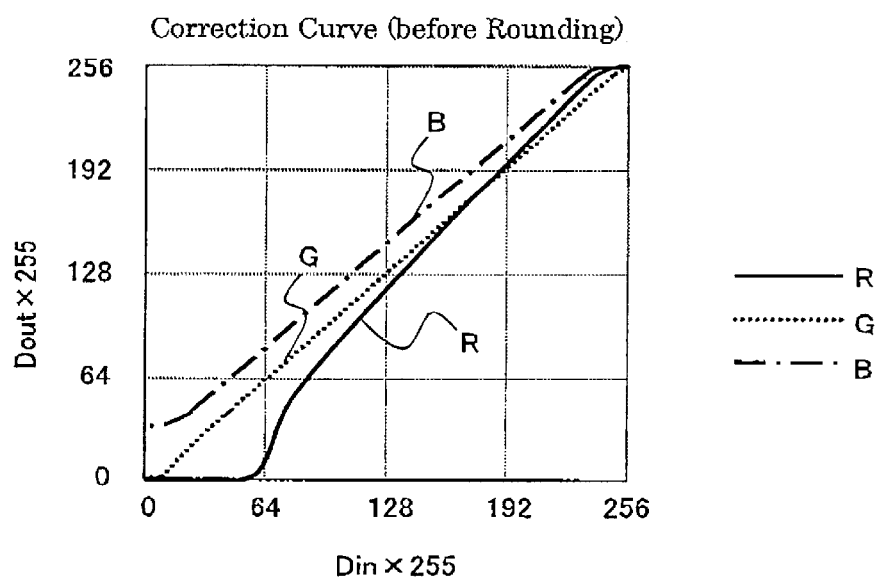
FIG. 15 is a graph showing an example of a correction curve before a rounding process.

An example of the final correction curve is shown in FIG. 15.

As shown in the above equations (34)–(36), the final correction curves are obtained (step 256), and therefore, a correction curve rounding process 1 with respect to step 225 of FIG. 4 is performed.

Correction Curve Rounding Process 1

Next, a correction curve rounding process 1 is executed (step 225).

As shown in FIG. 15, with respect to the correction curve expressed by the equation (34), there are Dout-change-free gradation in a low gray scale region and in a high gray scale region. Therefore, a correction curve rounding process is performed with respect to the correction curve in accordance with the following procedures. First, Dout4 is calculated from Dout by using the following equations:

$$Dout4=[Dout-|(Dout-Din)|^\beta](Dout>Din) \quad (37)$$

$$Dout4=[Dout+|(Dout-Din)|^\beta](Dout<Din) \quad (38)$$

In the above expressions (37) and (38), β is a parameter indicating the intensity of the rounding process. In accordance with the evaluation result which is obtained by actually observing image, a suitable value of β is about 1.5. With respect to the equations (37) and (38), there can be generated a correction curve free of any gray scale with Dout remaining at 0. After the correction curve rounding process 1 is completed, a correction curve rounding process 2 is performed.

Correction Curve Rounding Process 2

Next, a correction curve rounding process 2 is executed (step 226)

In the correction curve rounding process 2, with respect to each of various points of the equations (37) and (38), a means is taken of a total of five points which are each point plus two points on the front side and two points on the rear side of each point.

For example, if $Din\times 255=128$, $$Dout5(128)=[Dout4(112)+Dout4(120)+Dout4(128)+Dout4(136)+Dout4(144)]/5 \quad (39)$$

The correction curve can be smoothed by performing the correction curve rounding process 2.

With respect to the following four points, i.e. $Din\times 255=0$, 8, 248, 255, $$Dout5(0)=Dout4(0) \quad (40)$$

$$Dout5(8)=[Dout4(0)+Dout4(8)+Dout4(16)]/3 \quad (41)$$

$$Dout5(248)=[Dout4(240)+Dout4(248)+Dout4(255)]/3 \quad (42)$$

$$Dout5(255)=Dout4(255) \quad (43)$$

Therefore, after the correction curve rounding process 2 is completed, a correction curve rounding process 3 is performed.

Correction Curve Rounding Process 3

Next, a correction curve rounding process 3 is executed (step 227).

In the correction curve rounding process 3, Dout6 is calculated by using the following equations:

$$Dout6=Din+(Dout5-Din)[1-\{(0.25-Din)/0.25\}^\theta](Din\times 255<64) \quad (44)$$

$$Dout6=Din+(Dout5-Din)[1-\{(Din-0.75)/0.25\}^\theta](Din\times 255>192) \quad (45)$$

The "Dout6" is the final result of correction.

Figure 16:
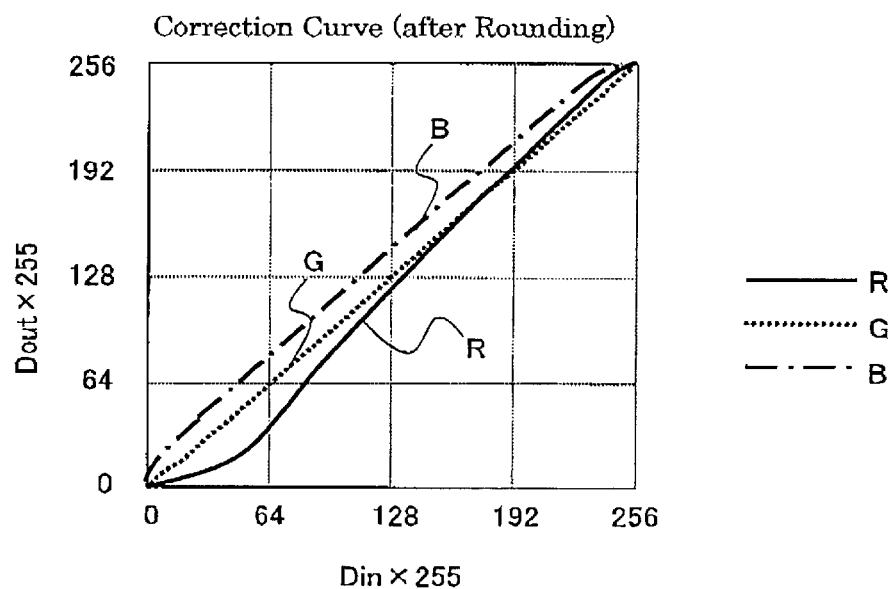
FIG. 16 is a graph showing an example of a correction curve after a rounding process.

The result is shown in FIG. 16. As shown in FIG. 16, the correction is not performed in the vicinity of $Din\times 255=0$ or $Din\times 255=255$, and therefore, the maximum luminance of the projector and the contrast are maintained. In the above equations (44) and (45), "θ" represents the parameter for adjusting the degree of attenuation of the correction amount in the vicinity of $Din\times 255=0$ or $Din\times 255=255$. In accordance with the evaluation result which is obtained by actually observing image, a suitable value of θ is about 5.0.

If Dout5(0) and Dout5(255) is zero, $Dout6=Dout5$ without performing the correction curve rounding process 3 (step 227).

After the correction curve rounding process 3 is completed, the processing flow returns to step 228.

Second Embodiment

Figure 17:
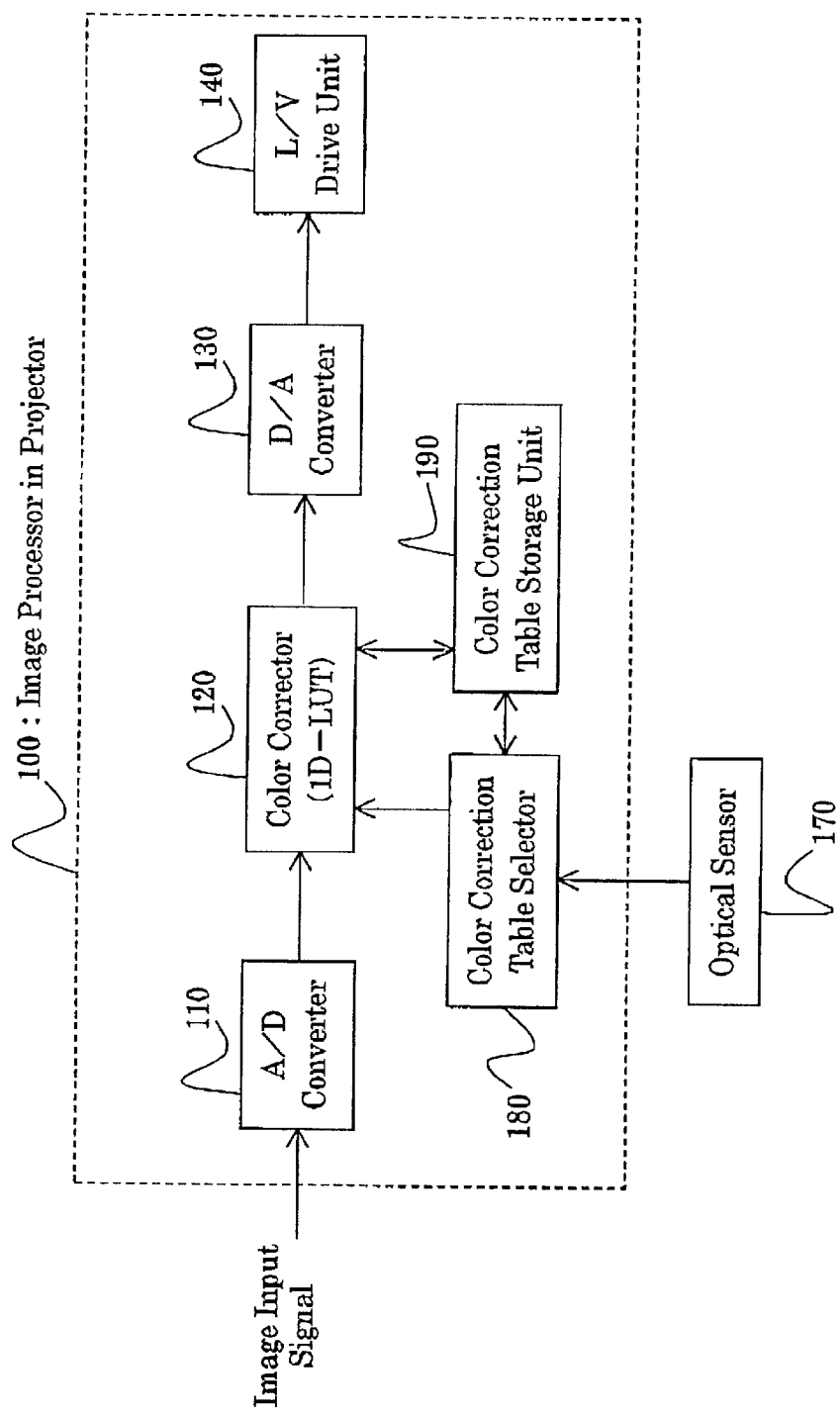
FIG. 17 is a functional block diagram of an image processor 100 used in a projector 20 according to the second embodiment of the present invention.

FIG. 17 is a functional block diagram of an image processor 100 installed in a projector 20 according to the second embodiment of the present invention, in which the same components as in the first embodiment are identified by the same reference numerals as in the first embodiment.

The image processor 100 in the projector of this second embodiment, like the first embodiment, is also provided with an A/D converter 110 for converting an analog image input signal into a digital signal, a color corrector 120 which applies a one-dimensional color correction table to RGB image input signals to make a desired color correction, a D/A converter 130 for converting a digital signal into an analog signal, and a L/V (light valve) drive unit 140 for actuating a liquid crystal light valve to make a projection display of image.

The image processor 100 in the projector of this second embodiment is further provided with a color correction table storage unit 190 for the storage of color correction tables, each of which corresponds to each environment, and a color correction table selector 180 for selecting in accordance with a colorimetric value provided from the optical sensor 170 a suitable color correction table from among the color correction tables stored in the color correction table storage unit 190.

In the projector of this second embodiment, color correction tables generated by the same correction curve calculation processing as the first embodiment are stored beforehand in the color correction table storage unit 190. Then, at the time of displaying an image actually, the color correction table selector 180 selects an appropriate color correction table in accordance with a colorimetric value provided from the optical sensor. On the basis of the color correction table thus selected, the color corrector 120 applies a desired color correction which takes the influence of external illumination into account to a digital image input signal. The thus color-corrected digital image input signal is converted to an analog signal by the D/A converter 130, and in accordance with the analog signal thus obtained, the L/V drive unit 140 actuates a liquid crystal light valve to make a projection display of image.

Color Correction Table Generation/Storage Processing

Figure 18:
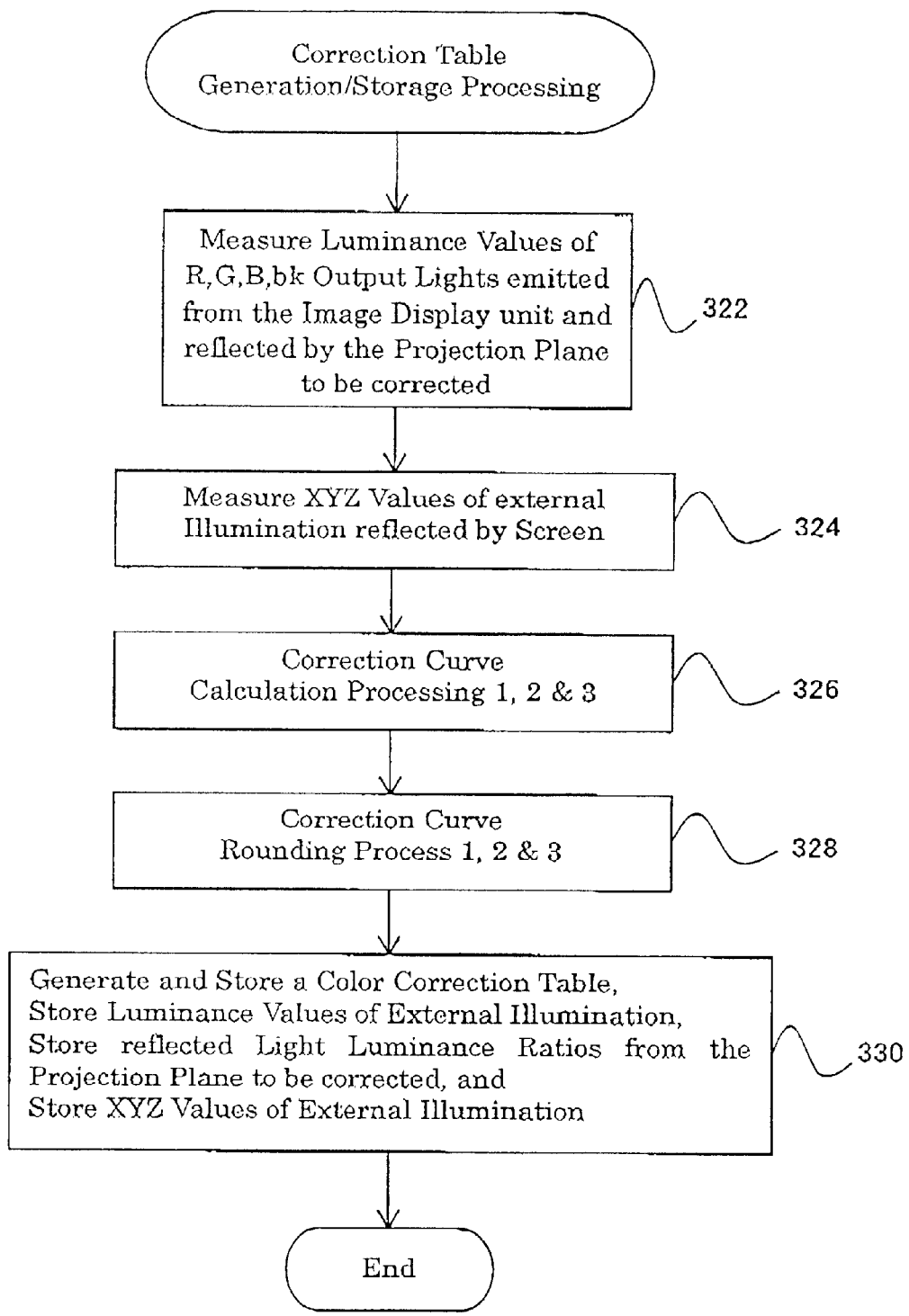
FIG. 18 is a flow chart for explaining a color correction table generation/storage processing performed by a color correction table generator 150 and a color correction table storage unit 190 both installed in the projector 20 of the second embodiment.

Next, with reference to FIG. 18, a description will be given below about a color correction table generation/storage processing for generating a color correction table and storing it into the color correction table storage unit 190.

In the color correction table generation/storage processing, R (red), G (green), B (blue), and bk (black) colors are outputted from the projector image display unit) 20 to the projection plane to be corrected and reflected light luminance values of such color outputs from the projection plane are measured by the optical sensor 170 (step 322). XYZ values of the reflected light from the screen 10 of the external illumination are also measured by the optical sensor 170 (step 324).

On the basis of the luminance values of steps 322 and 324, the same correction curve calculation processing 1, 2 & 3 (step 326), and the same correction curve rounding process 1, 2 & 3 (step 328) as the first embodiment are performed.

Further, a one-dimensional color correction table is generated on the basis of the thus-calculated correction curve, and the one-dimensional color correction table thus generated, luminance values (XYZ values) of external illumination and luminance ratios of reflected lights from the projection plane to be corrected are stored in the color correction table storage unit 190 (step 330).

The processings of steps 322 to 330 are repeated for another luminance value of external illumination and another projection plane to be corrected.

Operation of the Image Processor 100

Figure 19:
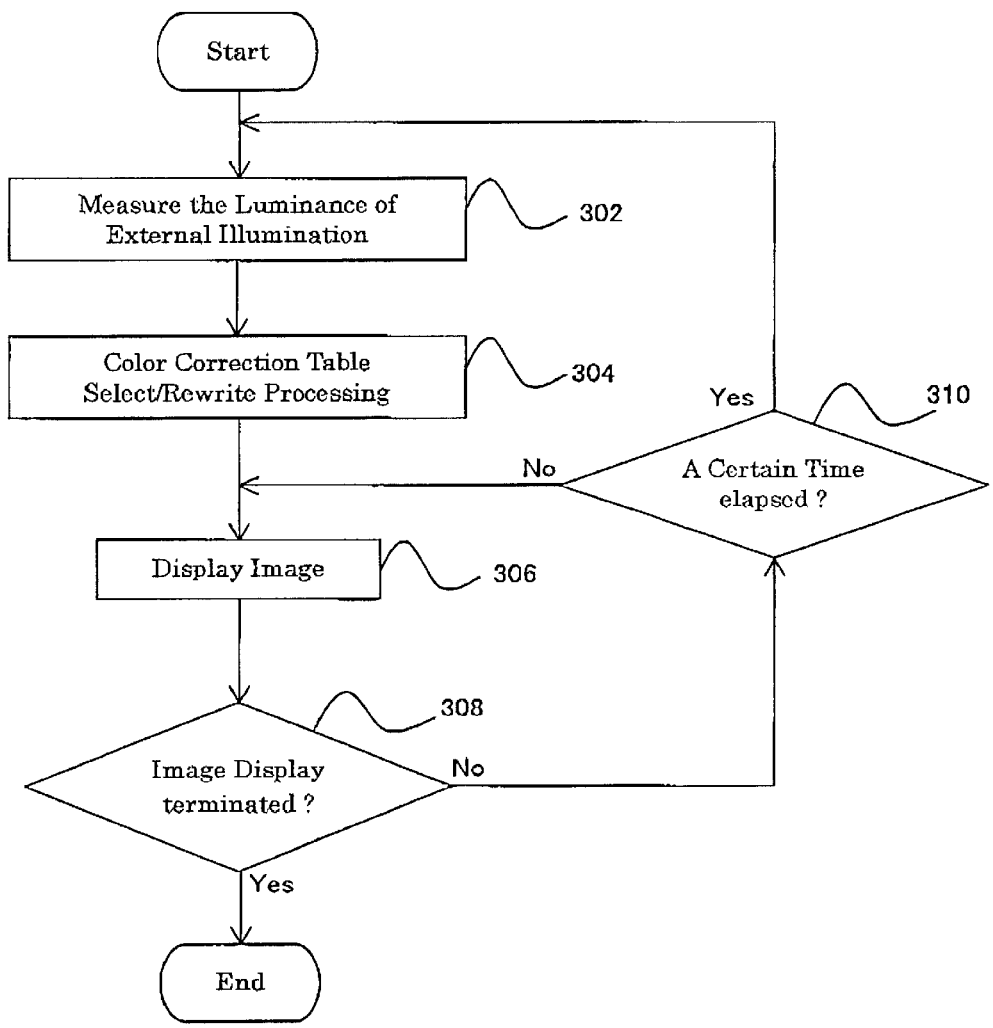
FIG. 19 is a flow chart for explaining the operation of the image processor 100 in the projector 20 of the second embodiment.

Next, with reference to FIG. 19, the following description is provided about the operation of the image processor 100 installed in the projector 20 of this second embodiment. The processing by the image processor 100, which will be described below, is carried out by executing an image processing program stored in a program storage unit (not shown) of the projector as in the first embodiment. The program storage unit constitutes a medium which stores the image processing program. Further, the image processing program itself is also included in the scope of the present invention.

With respect to the operation of the image processor 100, luminance ratios of RGB colors of projector on the projection plane to be corrected is previously calculated on the basis of the measured values (luminance values of R (red), G (green), B (blue), and bk (black) colors in a dark surround outputted from the projector and reflected by the reference projection plane, and luminance values of R (red), G (green), B (blue), and bk (black) colors in a dark surround outputted from the projector and reflected by the projection plane to be corrected).

First, when the use of the projector 20 is started, XYZ values of reflected light of an external illumination reflected by the screen 10 are measured by the optical sensor 170 (step 302).

Next, the color correction table selector 180 refers to luminance values of external illumination and the luminance ratios of the light outputted from a projector and reflected by the projection plane to be corrected, which are stored in the color correction table storage unit 190, then selects from the color correction table storage unit 190 a corresponding color correction table generated for luminance value of external illumination and reflected light luminance ratio closest to the luminance values of external illumination and the luminance ratios measured by the optical sensor 170 and informs the color corrector 120 of the corresponding color correction table. The color corrector 120 reads out the corresponding color correction table from the color correction table storage unit 190 and makes rewrite into the corresponding color correction table (step 304).

After the color correction table select/rewrite processing, there is made image display with reference to the rewritten color correction table and in accordance with the image signal color-corrected by the color corrector 120 (step 306). In this case, if the image display is not terminated (step 308, No) and if a certain time has not elapsed from the end of the last-time color correction table select/rewrite processing (step 310, No), the state of image display in step 306 continues. On the other hand, if the image display is not terminated (step 308, No) and if a certain time has elapsed from the end of the last-time color correction table select/rewrite processing (step 310, Yes), the luminance measurement for external illumination (step 302) and the color correction table select/rewrite processing (step 304) are performed taking into account the case where the brightness of external illumination changes with the lapse of time, and there is made image display (step 306). According to the present invention, since the color correction table is rewritten at every certain time while taking the change in environment such as the change in brightness of external illumination into account, an appropriate color reproduction is ensured even if the environment changes.

In the case where the image display is terminated, for example by turning OFF a power supply of the projector (step 308, Yes), the processing is ended.

Third Embodiment

Figure 20:
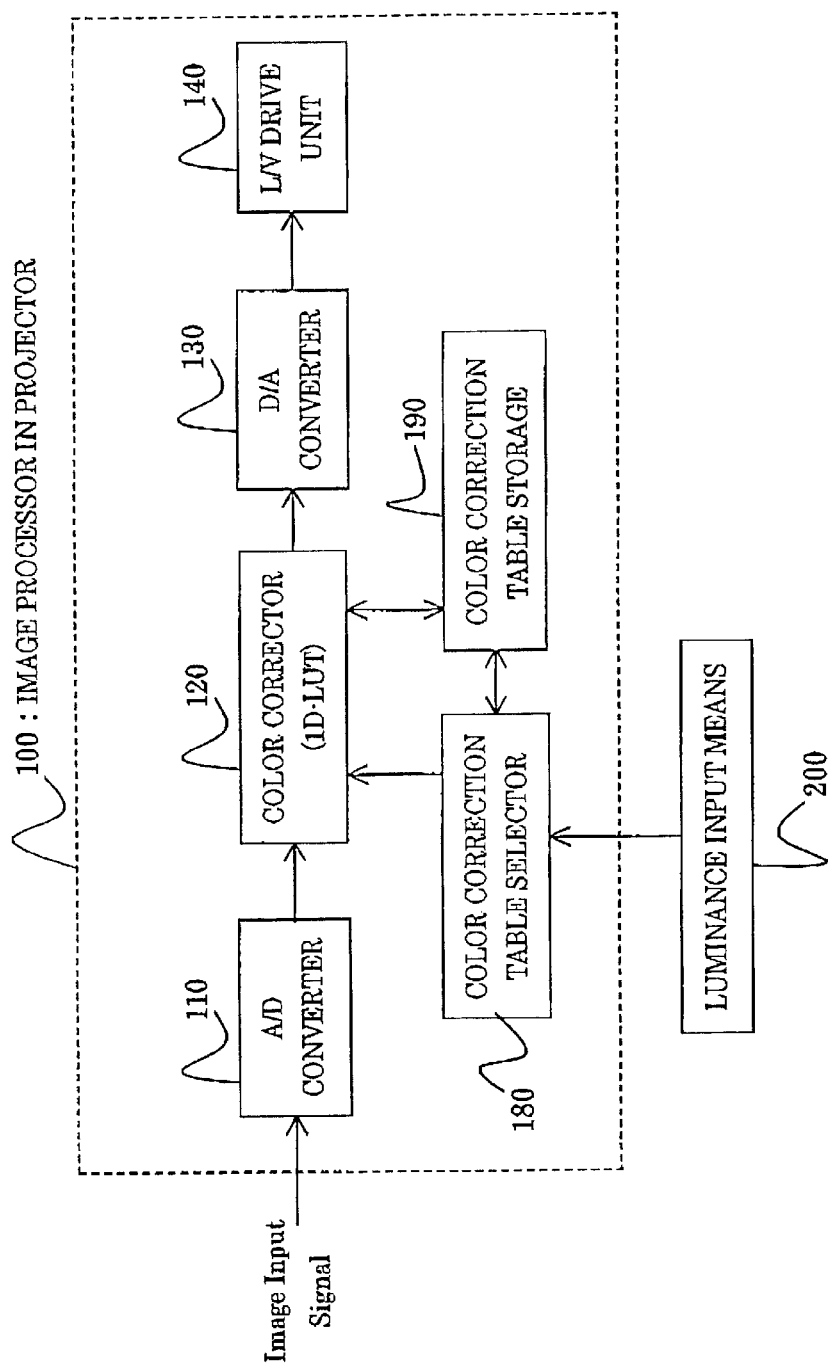
FIG. 20 is a functional block diagram of an image processor 100 used in a projector 20 according to the third embodiment of the present invention.

FIG. 20 is a functional block diagram of an image processor 100 installed in a projector 20 according to the third embodiment of the present invention, in which the same components as in the first and second embodiments are identified by the same reference numerals as in those previous embodiments.

The image processor 100 in the projector of this third embodiment, like the second embodiment, is also provided with an A/D converter 110 for converting an analog image input signal to a digital signal, a color corrector 120 for applying a one-dimensional color correction table to RGB image input signals to make a desired color correction, a D/A converter 130 for converting a digital signal to an analog signal, and a L/V (light valve) drive unit 140 for actuating a liquid crystal light valve to make a projection display of image.

The image processor 100 in the projector of this third embodiment, like the second embodiment, is also provided with a color correction table storage unit 190 for storing color correction tables for environments, and a correction table selector 180 for selecting a suitable color correction table from among the color correction tables stored in the color correction table storage unit 190.

The image processor 100 in the projector of the third embodiment is different from the image processor used in the second embodiment in that (1) it is further provided with a luminance input means 200 for inputting a luminance value of external illumination and luminance ratio of light outputted from the projector and reflected by the projection plane to be corrected and in that (2) the color correction table selector 180 selects a suitable color correction table from among the color correction tables stored in the color correction table storage unit 190 on the basis of reflected light luminance values inputted from the luminance input means 200.

As to the color correction table generation/storage processing, it is the same as in the second embodiment, so an explanation thereof will here be omitted.

Operation of the Image Processor 100

Figure 21:
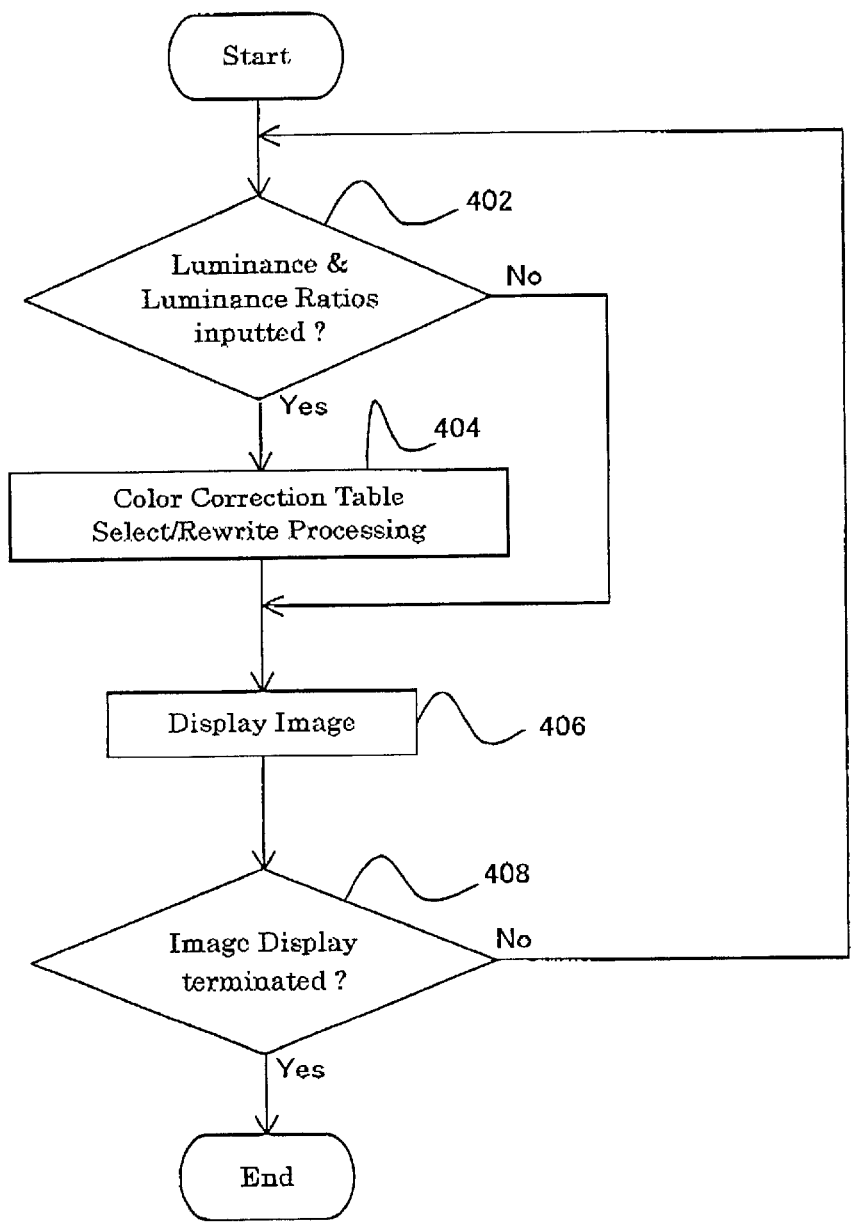
FIG. 21 is a flow chart for explaining the operation of the image processor 100 in the projector 20 of the third embodiment.

Next, with reference to FIG. 21, a description will be given below about the operation of the image processor 100 in the projector 20 of this third embodiment.

The following processing by the image processor 100 is carried out by executing an image processing program stored in a program storage unit (not shown) in the projector 20 as in the first and second embodiments. The program storage unit constitutes a medium which stores the image processing program. The image processing program itself is included in the scope of the present invention.

The operation of the image processor 100 in the projector 20 of this third embodiment is basically the same as in the second embodiment.

In the previous second embodiment, in step 302, luminance values of external illuminations are measured at every certain time by the optical sensor 170 and the color correction table selector 180 selects from the color correction table storage unit 190 a corresponding color correction table generated for luminance value and luminance ratio closest to the measured luminance values of external illuminations and luminance ratios of lights outputted from the projector and reflected by the projection plane to be corrected.

This third embodiment is different from such second embodiment in that, in step 402, luminance values of external illuminations and luminance ratios of lights outputted from the projector and reflected by the projection plane to be corrected are inputted by the luminance input means 200 and the color correction table selector 180 refers to the luminance values of external illuminations and the luminance ratios of lights outputted from the projector and reflected by the projection plane to be corrected, which are stored in the color correction table storage unit 190 and selects from the color correction table storage unit 190 a corresponding color correction table generated for luminance value and luminance ratio closest to the inputted luminance values of external illuminations and the inputted luminance ratios of lights outputted from the projector and reflected by the projection plane to be corrected.

When luminance values of external illuminations and luminance ratios of lights outputted from the projector and reflected by the projection plane to be corrected are inputted by the luminance input means 200 (step 402, Yes), the color correction table selector 180 informs the color corrector 120 of a corresponding color correction table. The color corrector 120 reads out the corresponding color correction table from the color correction table storage unit 190 and makes rewrite into the corresponding color correction table (step 404). Then, the display of image is performed with reference to the rewritten color correction table and on the basis of an image signal color-corrected by the color corrector 120 (step 406).

On the other hand, in the case where luminance values of external illuminations and luminance ratios of lights outputted from the projector and reflected by the projection plane to be corrected are not inputted by the luminance input means 200 (step 402, No), the display of image is performed without rewrite of the color correction table (step 406).

The above steps 402 to 406 are repeated until the image display is terminated, for example by turning OFF a power supply of the projector (step 408).

What is claimed is:

1. A method for generating correction curves for correcting image data inputted to an image display unit, comprising:

a $1^{st}$ correction curve generating step of generating a $1^{st}$ correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit;

a $2^{nd}$ correction curve generating step of generating a $2^{nd}$ correction curve for eliminating a difference between a reflection characteristic for each color component of an output provided from said image display unit and reflected by a predetermined projection plane and a reflection characteristic for each color component of the output provided from said image display and reflected by a reference projection plane; and a $3^{rd}$ correction curve generating step of generating a $3^{rd}$ correction curve which eliminates a difference in color components ratios of a predetermined external illumination.

2. A method for performing an image processing for image data inputted to an image display unit, using a $1^{st}$ correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit;

a $2^{nd}$ correction curve for eliminating a difference between a reflection characteristic for each color component of an output provided from said image display unit and reflected by a predetermined projection plane and a reflection characteristic for each color component of the output provided from said image display and reflected by a reference projection plane; and a $3^{rd}$ correction curve which eliminates a difference in color components ratios of a predetermined external illumination.

3. The method according to claim 2, wherein an image processing for image data using the $3^{rd}$ correction curve is performed after an image processing for image data using the $1^{st}$ correction curve and the $2^{nd}$ correction curve.

4. The method according to claim 2, having a plurality of $1^{st}$ correction curves obtained using different said predetermined luminance values.

5. The method according to claim 2, wherein said desired input tone range comprises a middle tone range and the vicinity thereof.

6. The method according to claim 2, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

7. The method according to claim 2, wherein the degree of approximation is adjustable.

8. The method according to claim 4, including a $1^{st}$ selection step of selecting one of plural $1^{st}$ correction curves on the basis of a luminance value of external illumination, and wherein the input image data is subjected to an image processing on the basis of the selected $1^{st}$ correction curve.

9. The method according to claim 8, further including a step of inputting the luminance value of external illumination used in said $1^{st}$ selection step.

10. The method according to claim 8, further including a step of measuring the luminance value of external illumination used in said $1^{st}$ selection step.

11. An image processing method according to claim 2, which uses a plurality of $2^{nd}$ correction curves for a plurality of projection planes.

12. An image processing method according to claim 2, wherein the amount of correction of input image data corrected by said $2^{nd}$ correction curve(s) is adjustable.

13. An image processing method according to claim 11, including a $2^{nd}$ selection step of selecting one $2^{nd}$ correction curve from among said plural $2^{nd}$ correction curves on the basis of a reflection characteristic for each color component reflected by a projection plane, and wherein an image processing is performed for input image data on the basis of the selected $2^{nd}$ correction curve.

14. An image processing method according to claim 13, further including a step of inputting the reflection characteristic for each color component reflected by the projection plane in said $2^{nd}$ selection step.

15. An image processing method according to claim 13, further including a step of measuring the reflection characteristic for each color component reflected by the projection plane in said $2^{nd}$ selection step.

16. The image processing method according to claim 2, using a plurality of $3^{rd}$ correction curves for each of plural external illuminations different in color components ratios.

17. The image processing method according to claim 2, wherein the difference in color components ratios of the predetermined external illumination is eliminated by offsetting said difference.

18. The image processing method according to claim 17, wherein the amount of said offset is determined by subtracting each color component from an average of color components.

19. The image processing method according to claim 17, wherein the amount of said offset is adjustable.

20. The image processing method according to claim 16, including a $3^{rd}$ selection step of selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

21. The image processing method according to claim 20, further including a step of inputting color components ratios of the external illumination in said $3^{rd}$ selection step.

22. The image processing method according to claim 20, further including a step of measuring color components ratios of the external illumination in said $3^{rd}$ selection step.

23. An image processing method according to claim 2, comprising the step of generating a final correction curve on a basis of the $1^{st}$ correction curve, the $2^{nd}$ correction curve and the $3^{rd}$ correction curve, and wherein said final correction curve is subjected to a rounding process in a low graduation region and in a high graduation region.

24. An image processing method according to claim 23, wherein the degree of said rounding process is adjustable.

25. An image display unit for performing an image processing for an inputted image data, wherein the image display unit performs the image processing for the inputted data based on the $1^{st}$ correction curve, the $2^{nd}$ correction curve and the $3^{rd}$ correction curve, which are sequentially generated by sequentially repeating the $1^{st}$ correction curve generating step, the $2^{nd}$ correction curve generating step and the $3^{rd}$ correction curve generating step, which are described in claim 1.

26. An image display unit for performing an image processing for an inputted image data, using:
a $1^{st}$ correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit;
a $2^{nd}$ correction curve for eliminating a difference between a reflection characteristic for each color component of an output provided from said image display unit and reflected by a predetermined projection plane and a reflection characteristic for each color component of the output provided from said image display and reflected by a reference projection plane; and
a $3^{rd}$ correction curve which eliminates a difference in color components ratios of a predetermined external illumination.

27. The image display unit according to claim 26, having a plurality of $1^{st}$ correction curves obtained using different said predetermined luminance values.

28. An image processing image display unit according to claim 26, which uses a plurality of $2^{nd}$ correction curves for a plurality of projection planes.

29. The image processing image display unit according to claim 26, using a plurality of $3^{rd}$ correction curves for each of plural external illuminations different in color components ratios.

30. The image display unit according to claim 25, wherein an image processing for image data using the $3^{rd}$ correction curve is performed after an image processing for image data using the $1^{st}$ correction curve and the $2^{nd}$ correction curve.

31. The image display unit according to claim 25, wherein said desired input tone range comprises a middle tone range and the vicinity thereof.

32. The image display unit according to claim 25, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

33. The image display unit according to claim 25, wherein the degree of approximation is adjustable.

34. An image processing image display unit according to claim 25, wherein the amount of correction of input image data corrected by said $2^{nd}$ correction curve(s) is adjustable.

35. The image processing image display unit according to claim 25, wherein the difference in color components ratios of the predetermined external illumination is eliminated by offsetting said difference.

36. The image processing image display unit according to claim 35, wherein the amount of said offset is determined by subtracting each color component from an average of color components.

37. The image processing image display unit according to claim 35, wherein the amount of said offset is adjustable.

38. The image display unit according to claim 27, including a $1^{st}$ selection means for selecting one of plural $1^{st}$ correction curves on the basis of a luminance value of external illumination, and wherein the input image data is subjected to an image processing on the basis of the selected $1^{st}$ correction curve.

39. The image display unit according to claim 38, further including a means for inputting the luminance value of external illumination used in said $1^{st}$ selection means.

40. The image display unit according to claim 38, further including a means for measuring the luminance value of external illumination used in said $1^{st}$ selection means.

41. An image processing image display unit according to claim 28, including a $2^{nd}$ selection means for selecting one $2^{nd}$ correction curve from among said plural $2^{nd}$ correction curves on the basis of a reflection characteristic for each color component reflected by a projection plane, and wherein an image processing is performed for input image data on the basis of the selected $2^{nd}$ correction curve.

42. An image processing image display unit according to claim 41, further including a means for inputting the reflection characteristic for each color component reflected by the projection plane in said $2^{nd}$ selection means.

43. An image processing image display unit according to claim 41, further including a means for measuring the reflection characteristic for each color component reflected by the projection plane in said $2^{nd}$ selection means.

44. The image processing image display unit according to claim 29, including a $3^{rd}$ selection means for selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

45. The image processing image display unit according to claim 44, further including a means for inputting color components ratios of the external illumination in said $3^{rd}$ selection means.

46. The image processing image display unit according to claim 44, further including a means for measuring color components ratios of the external illumination in said $3^{rd}$ selection means.

47. An image processing image display unit according to claim 25, comprising the means for generating a final correction curve on a basis of the $1^{st}$ correction curve, the $2^{nd}$ correction curve and the $3^{rd}$ correction curve, and wherein said final correction curve is subjected to a rounding process in a low graduation region and in a high graduation region.

48. An image processing image display unit according to claim 47, wherein the degree of said rounding process is adjustable.

49. A computer-readable medium storing correction curves to perform an image processing for image data inputted to an image display unit, comprising:

a $1^{st}$ correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit;

a $2^{nd}$ correction curve for eliminating a difference between a reflection characteristic for each color component of an output provided from said image display unit and reflected by a predetermined projection plane and a reflection characteristic for each color component of the output provided from said image display and reflected by a reference projection plane; and a $3^{rd}$ correction curve which eliminates a difference in color components ratios of a predetermined external illumination.

50. A computer-readable medium having a program of instructions for execution by the computer to perform an image processing for image data inputted to an image display unit, wherein said image processing corrects input image data by using:

a $1^{st}$ correction curve based on an tone reproduction characteristic in an illuminated surround of said image display unit under illumination of a predetermined luminance value, said tone reproduction characteristic in an illuminated surround having been approximated to an tone reproduction characteristic in a dark surround of the image display unit;

a $2^{nd}$ correction curve for eliminating a difference between a reflection characteristic for each color component of an output provided from said image display unit and reflected by a predetermined projection plane and a reflection characteristic for each color component of the output provided from said image display and reflected by a reference projection plane; and a $3^{rd}$ correction curve which eliminates a difference in color components ratios of a predetermined external illumination.

51. The computer-readable medium according to claim 50, wherein an image processing for image data using the $3^{rd}$ correction curve is performed after an image processing for image data using the $1^{st}$ correction curve and the $2^{nd}$ correction curve.

52. The computer-readable medium according to claim 50, having a plurality of $1^{st}$ correction curves obtained using different said predetermined luminance values.

53. The computer-readable medium according to claim 50, wherein said desired input tone range comprises a middle tone range and the vicinity thereof.

54. The computer-readable medium according to claim 50, wherein said tone reproduction characteristic in a dark surround and said tone reproduction characteristic in an illuminated surround are normalized to a predetermined luminance range, and in the desired input tone range of input image data the normalized tone reproduction characteristic in an illuminated surround is approximated to the normalized tone reproduction characteristic in a dark surround.

55. The computer-readable medium according to claim 50, wherein the degree of approximation is adjustable.

56. The computer-readable medium according to claim 52, including a $1^{st}$ selection step of selecting one of plural $1^{st}$ correction curves on the basis of a luminance value of external illumination, and wherein the input image data is subjected to an image processing on the basis of the selected $1^{st}$ correction curve.

57. The computer-readable medium according to claim 56, further including a step of inputting the luminance value of external illumination used in said $1^{st}$ selection step.

58. The computer-readable medium according to claim 56, further including a step of measuring the luminance value of external illumination used in said $1^{st}$ selection step.

59. An image processing computer-readable medium according to claim 50, which uses a plurality of $2^{nd}$ correction curves for a plurality of projection planes.

60. An image processing computer-readable medium according to claim 50, wherein the amount of correction of input image data corrected by said $2^{nd}$ correction curve(s) is adjustable.

61. An image processing computer-readable medium according to claim 59, including a $2^{nd}$ selection step of selecting one $2^{nd}$ correction curve from among said plural $2^{nd}$ correction curves on the basis of a reflection characteristic for each color component reflected by a projection plane, and wherein an image processing is performed for input image data on the basis of the selected $2^{nd}$ correction curve.

62. An image processing computer-readable medium according to claim 61, further including a step of inputting the reflection characteristic for each color component reflected by the projection plane in said $2^{nd}$ selection step.

63. An image processing computer-readable medium according to claim 61, further including a step of measuring the reflection characteristic for each color component reflected by the projection plane in said $2^{nd}$ selection step.

64. The image processing computer-readable medium according to claim 50, using a plurality of $3^{rd}$ correction curves for each of plural external illuminations different in color components ratios.

65. The image processing computer-readable medium according to claim 50, wherein the difference in color components ratios of the predetermined external illumination is eliminated by offsetting said difference.

66. The image processing computer-readable medium according to claim 65, wherein the amount of said offset is determined by subtracting each color component from an average of color components.

67. The image processing computer-readable medium according to claim 65, wherein the amount of said offset is adjustable.

68. The image processing computer-readable medium according to claim 64, including a $3^{rd}$ selection step of selecting one $3^{rd}$ correction curve from a plurality of generated $3^{rd}$ correction curves on the basis of color components ratios of the predetermined external illumination, and wherein an image processing is performed for input image data on the basis of the selected $3^{rd}$ correction curve.

69. The image processing computer-readable medium according to claim 68, further including a step of inputting color components ratios of the external illumination in said $3^{rd}$ selection step.

70. The image processing computer-readable medium according to claim 68, further including a step of measuring color components ratios of the external illumination in said $3^{rd}$ selection step.

71. An image processing computer-readable medium according to claim 50, comprising the step of generating a final correction curve on a basis of the $1^{st}$ correction curve, the $2^{nd}$ correction curve and the $3^{rd}$ correction curve, and wherein said final correction curve is subjected to a rounding process in a low graduation region and in a high graduation region.

72. An image processing computer-readable medium according to claim 71, wherein the degree of said rounding process is adjustable.

* * * * *